US012535974B2

(12) United States Patent
Miyazaki

(10) Patent No.: US 12,535,974 B2
(45) Date of Patent: Jan. 27, 2026

(54) NON-TRANSITORY COMPUTER-READABLE STORAGE MEDIUM AND CONTROL DEVICE FOR CONDITIONAL NOTIFICATION

(71) Applicant: BROTHER KOGYO KABUSHIKI KAISHA, Nagoya (JP)

(72) Inventor: Masashi Miyazaki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/631,554

(22) Filed: Apr. 10, 2024

(65) Prior Publication Data

US 2024/0256192 A1 Aug. 1, 2024

Related U.S. Application Data

(62) Division of application No. 17/725,625, filed on Apr. 21, 2022, now Pat. No. 11,983,448.

(30) Foreign Application Priority Data

Apr. 28, 2021 (JP) ................................ 2021-076059

(51) Int. Cl.
*G06F 3/12* (2006.01)
*G03G 15/00* (2006.01)
(Continued)

(52) U.S. Cl.
CPC ........... *G06F 3/121* (2013.01); *G03G 15/553* (2013.01); *G06F 3/1229* (2013.01);
(Continued)

(58) Field of Classification Search
CPC ...... G06F 3/1229; G06F 3/121; G06F 3/1235; G06Q 30/0207; G03G 15/553
(Continued)

(56) References Cited

U.S. PATENT DOCUMENTS 6,295,423 B1 9/2001 Haines et al.
11,126,955 B1 * 9/2021 Watson .............. G06Q 30/0633
(Continued)

FOREIGN PATENT DOCUMENTS

JP 2002352127 A 12/2002
JP 2003-066788 A 3/2003
(Continued)

OTHER PUBLICATIONS

Office Action dated Aug. 17, 2023 received in U.S. Appl. No. 17/725,625.
(Continued)

*Primary Examiner* — Jamares Q Washington
(74) *Attorney, Agent, or Firm* — Scully, Scott, Murphy & Presser, P.C.

(57) ABSTRACT

A control device controls a notification regarding a consumable. The control device has an acquisition unit which acquires remaining amount data regarding a remaining amount of a consumable in a printer, a calculation unit which calculates a predicted execution time, at which predetermined processing relating to replenishment of the consumable is executed, with using the remaining amount data, a determination unit which determines whether a first specific condition is satisfied, with using a plurality of information including a period for discount sale of the consumable and the predicted execution time, and a notification unit which performs processing for notifying a user of first information including information regarding the discount sale of the consumable, in a case where it is determined that the first specific condition is satisfied.

6 Claims, 21 Drawing Sheets

(51) Int. Cl.
    *G06Q 30/0207*    (2023.01)
    *G06Q 30/0235*    (2023.01)

(52) U.S. Cl.
    CPC ....... *G06F 3/1235* (2013.01); *G06Q 30/0207* (2013.01); *G06Q 30/0235* (2013.01)

(58) Field of Classification Search
    USPC .................................... 358/1.15; 399/24, 30
    See application file for complete search history.

(56) References Cited

U.S. PATENT DOCUMENTS

| | | |
|---|---|---|
| 2002/0049638 A1 | 4/2002 | Ito |
| 2002/0178110 A1 | 11/2002 | Yoshiura et al. |
| 2005/0137941 A1 | 6/2005 | Fujinawa |
| 2008/0071626 A1* | 3/2008 | Hill ..................... G06Q 20/203 705/22 |
| 2012/0076515 A1 | 3/2012 | Rapkin et al. |
| 2020/0151639 A1* | 5/2020 | Mayer .............. G06Q 10/06315 |
| 2020/0210126 A1 | 7/2020 | Miyazawa |

FOREIGN PATENT DOCUMENTS

| | | | |
|---|---|---|---|
| JP | 2004-078412 A | 3/2004 | |
| JP | 2005181841 A | 7/2005 | |
| JP | 2010089337 A | 4/2010 | |
| JP | 2015032115 A | 2/2015 | |
| JP | 2020104359 A | 7/2020 | |
| WO | WO-2013062508 A1 * | 5/2013 | ........... G06Q 30/016 |

OTHER PUBLICATIONS

Notice of Allowance dated Jan. 10, 2024 received in U.S. Appl. No. 17/725,625.

* cited by examiner

FIG. 2A

| PRINTER IDENTIFIER PID | FIRST TYPE T11 | SECOND TYPE T12 | CARTRIDGE REPLACEMENT DATE D1 | CONSUMABLE REMAINING AMOUNT A1 |
|---|---|---|---|---|
| P1 | ink | color | LAST TIME<br>K: 2020-10-30<br>C: 2020-09-30<br>M: 2020-09-30<br>Y: 2020-09-30<br><br>BEFORE LAST TIME<br>K: 2020-09-30<br>C: 2020-07-30<br>M: 2020-07-30<br>Y: 2020-07-30 | K: 10%<br>C: 30%<br>M: 35%<br>Y: 20% |
| P2 | ink | mono | LAST TIME<br>K: 2020-08-20<br><br>BEFORE LAST TIME<br>K: 2020-02-20 | K: 50% |
| P3 | ink | mono | LAST TIME<br>K: 2020-06-20<br><br>BEFORE LAST TIME<br>K: 2020-03-20 | K: 50% |
| ⋮ | ⋮ | ⋮ | ⋮ | ⋮ |

FIG. 2B

| USER IDENTIFIER UID | AUTHENTICATION DATA D2 | NAME NM | ADDRESS AD | POSSESSED PRINTER UPID | CARTRIDGE STOCK CS |
|---|---|---|---|---|---|
| U1 | D21 | NM1 | AD1 | P1 | K: 0<br>C: 0<br>M: 0<br>Y: 0 |
| U2 | D22 | NM2 | AD2 | P2 | K: 1 |
| ⋮ | ⋮ | ⋮ | ⋮ | ⋮ | ⋮ |

FIG. 3A

| CODE NAME N31 | PRODUCT NAME N32 | DISCOUNT RATE R3 | DELIVERY START DATE D31 | EXPIRATION DATE D32 | NOTIFIED USER NU |
|---|---|---|---|---|---|
| ink1 | Black_S | 20% | 2020-12-01 | 2020-12-31 | U1 |
| ink2 | Black_D | 5% | 2020-12-01 | 2020-12-31 | – |
| ink3 | Yellow_S | 21% | 2020-12-01 | 2020-12-31 | – |
| ⋮ | ⋮ | ⋮ | ⋮ | ⋮ | ⋮ |

| COUNTRY CODE CD | TYPE T4 | PRODUCT NAME N32 | UNIT PRICE PR | STOCKED AMOUNT NC |
|---|---|---|---|---|
| JP | SINGLE COLOR C | Cyan_S | 2500 | 20 |
| JP | SINGLE COLOR M | Magenta_S | 2500 | 13 |
| ⋮ | ⋮ | ⋮ | ⋮ | ⋮ |
| JP | 4-COLOR PACK | 4C_S | 9000 | 10 |
| JP | BK∗2 PACKS | Black_D | 4500 | 2 |
| JP | LARGE CAPACITY SINGLE COLOR C | Cyan_DX | 4500 | 3 |
| JP | LARGE CAPACITY SINGLE COLOR M | Magenta_DX | 4500 | 6 |
| ⋮ | ⋮ | ⋮ | ⋮ | ⋮ |
| JP | LARGE CAPACITY 4-COLOR PACK | 4C_DX | 16000 | 4 |
| JP | LARGE CAPACITY BK∗2 PACKS | Black_DX_D | 8000 | 0 |
| ⋮ | ⋮ | ⋮ | ⋮ | ⋮ |

DB4

NON-TRANSITORY COMPUTER-READABLE STORAGE MEDIUM AND CONTROL DEVICE FOR CONDITIONAL NOTIFICATION

CROSS-REFERENCE TO RELATED APPLICATION

This application is a divisional application of U.S. application Ser. No. 17/725,625 filed on Apr. 21, 2022, which is based upon and claims the benefit of priority from prior Japanese patent application No. 2021-076059, filed on Apr. 28, 2021, the entire contents of which are incorporated herein by reference.

BACKGROUND

A printer is used to print an image. The printer has a variety of consumable components such as printing materials (ink, toner and the like), a conveying roller, and the like. A technology of selecting replacement components to be replaced among consumable components in ascending order of cost and notifying a user of the replacement components in ascending order of cost is suggested.

The printer has consumables such as printing materials whose remaining amounts decrease by printing. As processing of replenishing consumables, for example, a notification regarding the remaining amount may be performed. For example, the user considers purchasing a consumable, and the like, based on the notification. It is susceptible to study in the notification regarding such consumables.

SUMMARY

The present disclosure discloses a technology that allows for flexible notification regarding consumables.

A first aspect of the disclosure is a non-transitory computer-readable storage medium storing a computer program for a computer configured to control a notification regarding a consumable. The computer program includes instructions executed. The instructions cause the computer to perform acquiring remaining amount data regarding a remaining amount of a consumable in a printer. The instructions cause the computer to perform calculating a predicted execution time, at which predetermined processing relating to replenishment of the consumable is executed, with using the remaining amount data. The instructions cause the computer to perform determining whether a first specific condition is satisfied, with using a plurality of information including a period for discount sale of the consumable and the predicted execution time. The instructions cause the computer to perform processing for notifying a user of first information including information regarding the discount sale of the consumable, in a case where it is determined that the first specific condition is satisfied.

A second aspect of the disclosure is a non-transitory computer-readable storage medium storing a computer program for a computer configured to control a notification regarding a consumable. The computer program includes instructions executed. The instructions cause the computer to perform acquiring remaining amount data regarding a remaining amount of a consumable in a printer. The instructions cause the computer to perform processing for notifying a user of second information including information regarding purchase of a selling product associated with a change in remaining amount over time indicated by the remaining amount data among a plurality of selling products of the consumable, in a case where a second specific condition is satisfied.

A third aspect of the disclosure is a control device configured to control a notification regarding a consumable. The control device includes an acquisition unit, a calculation unit, a determination unit and a notification unit. The acquisition unit is configured to acquire remaining amount data regarding a remaining amount of a consumable in a printer. The calculation unit is configured to calculate a predicted execution time, at which predetermined processing relating to replenishment of the consumable is executed, with using the remaining amount data. The determination unit is configured to determine whether a first specific condition is satisfied, with using a plurality of information including a period for discount sale of the consumable and the predicted execution time. The notification unit is configured to perform processing for notifying a user of first information including information regarding the discount sale of the consumable, in a case where it is determined that the first specific condition is satisfied.

A fourth aspect of the disclosure is a control device configured to control a notification regarding a consumable. The control device includes an acquisition unit and a notification unit. The acquisition unit is configured to acquire remaining amount data regarding a remaining amount of a consumable in a printer. The notification unit is configured to perform processing for notifying a user of second information including information regarding purchase of a selling product associated with a change in remaining amount over time indicated by the remaining amount data among a plurality of selling products of the consumable, in a case where a second specific condition is satisfied.

According to the first and third aspects, it is determined whether the first specific condition is satisfied, with using the plurality of information including the period for discount sale of the consumable and the predicted execution time. Therefore, when appropriate, it is possible to notify the user of the first information including the information regarding the discount sale of the consumable.

According to the second and fourth aspects, it is possible to notify the user of the information regarding the purchase of the selling product of the consumable suitable for the change in remaining amount over time.

Note that, the technology disclosed in the present specification can be implemented in various aspects, for example, a control method and a control device, a computer program for realizing functions of the method or device, a recording medium having the computer program recorded thereon (for example, a non-transient recording medium), and the like.

BRIEF DESCRIPTION OF DRAWINGS

FIGS. 2A and 2B illustrate examples of management data.

FIGS. 3A and 3B illustrate examples of the management data.

DETAILED DESCRIPTION

A. First Embodiment

A-1. Configuration of System 1000

Figure 1:
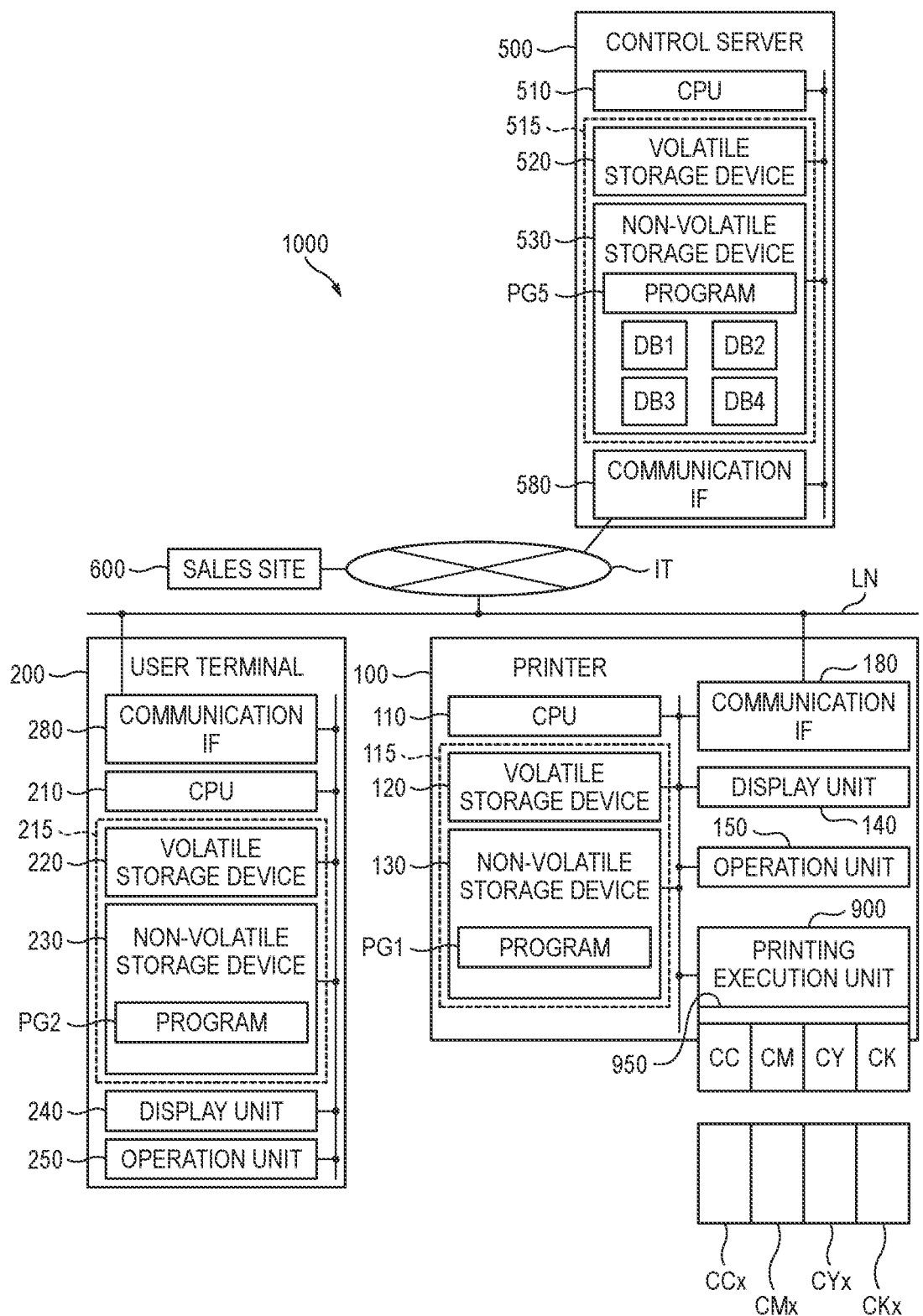
FIG. 1 is a block diagram showing a configuration of a system 1000.

FIG. 1 is a block diagram showing a configuration of a system 1000. The system 1000 includes a printer 100, a user terminal 200, a control server 500, and a sales site server 600. The control server 500 and the sales site server 600 are connected to the Internet IT. The printer 100 and the user terminal 200 are connected to a local area network LN. The local area network LN is connected to the Internet IT. These apparatuses 100, 200, 500 and 600 can communicate with each other.

The printer 100 includes a CPU 110, a storage device 115, a display unit 140, an operation unit 150, a printing execution unit 900, and a communication interface 180. These elements are connected to each other via a bus. The storage device 115 includes a volatile storage device 120 and a non-volatile storage device 130.

The display unit 140 is a device configured to display an image, and is, for example, a liquid crystal monitor. The operation unit 150 is a device configured to receive an operation made by a user, and includes, for example, a touch panel overlapped and arranged on the display unit 140. The user can input various instructions to the printer 100 by operating the operation unit 150. The communication interface 180 is an interface (for example, a wired LAN interface, a wireless interface of IEEE 802.11) for performing communication with other apparatuses. In the present embodiment, the communication interface 180 is connected to the local area network LN. The printing execution unit 900 is a device configured to print an image on a sheet (an example of a printing medium) with using a printing material with a predetermined method (for example, a laser method or an inkjet method). In the present embodiment, the printing execution unit 900 is an inkjet-type printing device capable of printing a color image with using four varieties of inks of cyan C, magenta M, Yellow Y and Black K. The printing execution unit 900 includes a mounting unit 950. Four varieties of usual ink cartridges CC, CM, CY and CK corresponding to each of the four colors of CMYK are mounted to the mounting unit 950 (hereinafter, the usual ink cartridge is also simply referred to as a usual cartridge). In the present embodiment, instead of the usual ink cartridges CC, CM, CY and CK, large-capacity cartridges CCx, CMx, CYx, and CKx configured to contain larger amounts of inks can be mounted to the mounting unit 950. When the remaining amount of ink is small, the ink is replenished by removing the cartridge from the mounting unit 950 and mounting a new cartridge (a usual cartridge or a large-capacity cartridge) to the mounting unit 950.

The CPU 110 is an example of the data processing device. The volatile storage device 120 is, for example, a DRAM, and the non-volatile storage device 130 is, for example, a flash memory. The non-volatile storage device 130 is configured to store a program PG1. The CPU 110 is configured to execute various processing by executing the program PG1. The CPU 110 is configured to temporarily store various intermediate data used for executing the program PG1 in the storage device 115 (for example, the volatile storage device 120 or the non-volatile storage device 130). Details of the processing that is executed by the CPU 110 will be described later. Note that, in the present embodiment, the program PG1 is stored in advance in the non-volatile storage device 130 as firmware by the manufacturer of the printer 100.

The control server 500 is an example of the computer configured to control a notification regarding the remaining amount of ink in each of a plurality of printers including the printer 100. The control server 500 includes a CPU 510, a storage device 515, and a communication interface 580. These elements are connected to each other via a bus. The storage device 515 includes a volatile storage device 520 and a non-volatile storage device 530.

The communication interface 580 is an interface (for example, a wired LAN interface, a wireless interface of IEEE 802.11) for performing communication with other apparatuses. In the present embodiment, the communication interface 580 is connected to the Internet IT.

The CPU 510 is an example of the data processing device. The volatile storage device 520 is, for example, a DRAM, and the non-volatile storage device 530 is, for example, a flash memory. The non-volatile storage device 530 is configured to store a program PG5 and management data DB1 to DB4. The CPU 510 is configured to control the notification regarding the remaining amount of ink by executing the program PG5. The CPU 510 is configured to temporarily store various intermediate data used for executing the program PG5 in the storage device 515 (for example, the volatile storage device 520 or the non-volatile storage device 530). Details of the processing that is executed by the CPU 510 and the management data DB1 to DB4 will be described later.

The user terminal 200 is a terminal device (for example, a smart phone, a tablet computer, and the like) of a user who manages the printer 100. The user can use the user terminal 200 to receive a notification regarding the remaining amount of ink in the printer 100. The user terminal 200 includes a CPU 210, a storage device 215, a display unit 240, an operation unit 250, and a communication interface 280. These elements are connected to each other via a bus. The storage device 215 includes a volatile storage device 220 and a non-volatile storage device 230.

The display unit 240 is a device configured to display an image, and is, for example, a liquid crystal monitor. The operation unit 250 is a device configured to receive an operation made by a user, and includes, for example, a touch panel overlapped and arranged on the display unit 240. The user can input various instructions to the user terminal 200 by operating the operation unit 250.

The communication interface 280 is an interface (for example, a wired LAN interface, a wireless interface of IEEE 802.11) for performing communication with other apparatuses. In the present embodiment, the communication interface 280 is connected to the local area network LN.

The CPU 210 is an example of the data processing device. The volatile storage device 220 is, for example, a DRAM, and the non-volatile storage device 230 is, for example, a flash memory. The non-volatile storage device 230 is configured to store a program PG2. The CPU 210 is configured to execute various functions relating to the printer 100 by executing the program PG2 (which will be described in detail later).

The CPU 210 is configured to temporarily store various intermediate data used for executing the program PG2 in the storage device (for example, the volatile storage device 220 or the non-volatile storage device 230). Note that, in the present embodiment, the program PG2 is provided by a server (not shown). Instead, the program PG2 may be provided by a portable recording medium such as a memory card.

The sales site server 600 is a server for mail-order sale of cartridges containing printing materials (ink, toner, and the like). Although not shown, a hardware configuration of the sales site server 600 is the same as the hardware configuration of the control server 500.

A-2. Configuration of Management Data

FIGS. 2A, 2B, 3A and 3B illustrate examples of management data that are used for management of the printer 100. FIG. 2A shows an example of first management data DB1 (also simply referred to as first data DB1). The first data DB1 is data relating to a configuration of each of a plurality of printers and a remaining amount of ink. Specifically, the first data DB1 shows a correspondence relationship among a printer identifier PID, a first type T11, a second type T12, a cartridge replacement date D1, and a consumable remaining amount A1. The printer identifier PID is identification information of a printer. The first type T11 indicates a printing method of the printer. In the present embodiment, the first type T11 is "ink (inkjet method)" or "laser (laser method)". The second type T12 indicates a type of a printing color of the printer. In the present embodiment, the second type T12 is "color (color printer)" or "mono (monochrome printer)". The color printer prints a color image with using printing materials of four colors of CMYK. The monochrome printer prints a monochrome image with using a K (black) printing material. The cartridge replacement date D1 indicates a replacement date last time and a replacement date before last time for each cartridge that can be used by the printer. The consumable remaining amount A1 indicates a remaining amount for each printing material that can be used by the printer (a unit is a percentage, in the present embodiment). The information PID, T11, T12 and A1 regarding the printer is registered in advance by an administrator of the control server 500. In the consumable remaining amount A1, a remaining amount of each printing material is set to a predetermined initial value (for example, 100%). The cartridge replacement date D1 and the consumable remaining amount A1 are updated by printer information transmission processing, which will be described later.

FIG. 2B shows an example of second management data DB2 (also simply referred to as second data DB2). The second data DB2 is data relating to a user and a printer possessed by the user. Specifically, the second data DB2 shows a correspondence relationship among a user identifier UID, authentication data D2, a name NM, an address AD, a possessed printer UPID, and a cartridge stock CS. The user identifier UID is identification information of a user. The authentication data D2 is authentication data (for example, a hash value of a password) for receiving a service by the control server 500. The name NM and the address AD are a name and an address of the user. The possessed printer UID is an identifier PID of a printer possessed by the user. The cartridge stock CS is the number of cartridges possessed by the user, and indicates the number of cartridges that can be mounted to the printer. The information UID, D2, NM, AD and UPID relating to the user is registered in advance by the administrator of the control server 500. In the cartridge stock CS, the number of each cartridge is set to a predetermined initial value (for example, 0). The cartridge stock CS is updated by processing (printer information transmission processing, purchase processing, and the like), which will be described later.

FIG. 3A shows an example of third management data DB3 (also simply referred to as third data DB3). The third data DB3 is data relating to discount sale of a cartridge for a limited time. Specifically, the third data DB3 shows a correspondence relationship among a code name N31, a product name N32, a discount rate R3, a delivery start date D31, an expiration date D32, and a notified user NU. The code name N31 is identification information of discount sale. The product name N32 is a product name of a cartridge to be discount-saled. The discount rate R3 is a discount rate of price by the discount sale. The delivery start date D31 is a start date of the discount sale. The expiration date D32 is an expiration date of the discount sale, i.e., an expired date of the discount sale. In the present embodiment, the information D31 and D32 indicates a combination of a year, a month, and a day. The notified user NU is an identifier UID of a user who has been notified regarding the discount sale. When a plurality of users have been notified regarding one discount sale, the notified user NU indicates the identifiers UID of the plurality of notified users. The CPU 510 of the control server 500 acquires information regarding discount sale from the sales site server 600, and updates the information N31, N32, R3, D31 and D32 of the third data DB3, based on the acquired information. The notified user NU is updated by processing (control processing, and the like), which will be described later.

FIG. 3B shows an example of fourth management data DB4 (also simply referred to as fourth data DB4).

The fourth data DB4 is data relating to a selling product of the cartridge that is sold through the sales site server 600. Specifically, the fourth data DB4 shows a correspondence relationship among a country code CD, a type T4, a product name N32, a unit price PR, and a stocked amount NC. The country code CD is identification information of a country where a selling product is sold. The type T4 is a type of the selling product. In the present embodiment, the type of the selling product is any one of "single color", "4-color pack", "2 packs", "large capacity single color", "large capacity 4-color pack", and "large capacity 2 packs". "Single color" is one usual cartridge of any one color of CMYK. "4-color pack" is a pack of four usual cartridges of CMYK. "2 packs" is two usual cartridge packs of any one color of CMYK. "Large-capacity single color" is one large-capacity cartridge of any one color of CMYK. "Large capacity 4-color pack" is a pack of four large-capacity cartridges of CMYK. "Large capacity 2 packs" is two large-capacity cartridge packs of any one color of CMYK. The product name N32 is a product name of the selling product. The unit price PR is a unit price of the selling product. The stocked amount NC is the number of inventories for sale via the sales site server 600. The information CD, T4, N32, PR and NC regarding the selling product is registered in advance by the administrator of the control server 500. The stocked amount NC is updated by processing (purchase processing, and the like), which will be described later. In addition, when the stock for sale is replenished, the administrator updates the stocked amount NC.

A-3. Printer Information Transmission Processing

Figure 4:
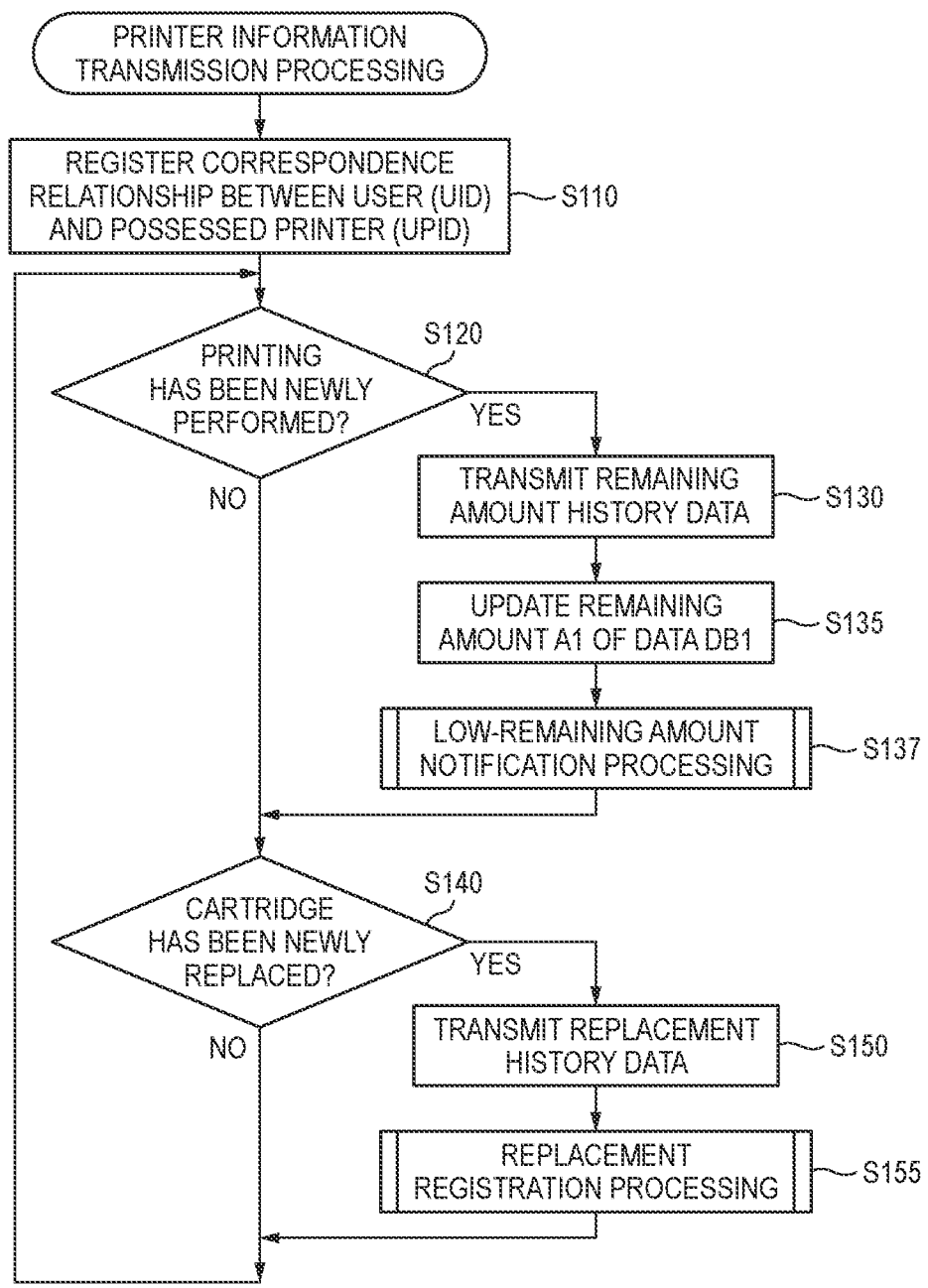
FIG. 4 is a flowchart showing an example of printer information transmission processing.

FIG. 4 is a flowchart showing an example of printer information transmission processing. The printer information transmission processing is processing of registering a use history of the printer 100 in the control server 500 (FIG. 1). Hereinafter, the processing of FIG. 4 is described, assuming that the use history of the printer 100 is registered. The CPU 110 of the printer 100 executes the processing of FIG. 4, according to the program PG1. In the present embodiment, the CPU 110 starts the processing of FIG. 4, in response to startup of the printer 100.

In S110, the CPU 110 executes user registration processing. The user operates the operation unit 150 to input the user identifier UID of the user and an authentication key (a password, a secret key, and the like) of the user into the printer 100. Hereinafter, the user identifier UID that is input is also referred to as "notice user identifier UID", the authentication key that is input is also referred to as "input authentication key", and the user associated with the notice user identifier UID is also referred to as "notice user". The CPU 110 transmits registration data, which indicates a notice printer identifier PID, which is a printer identifier PID of the printer 100 determined in advance, a notice user identifier UID, and an input authentication key, to the control server 500. Hereinafter, the printer 100 associated with the notice printer identifier PID is also referred to as the notice printer 100. The CPU 510 of the control server 500 performs user authentication with using the input authentication key and the authentication data D2 (FIG. 2B) associated with the notice user identifier UID.

When the user authentication is successful, the CPU 510 of the control server 500 searches the second data DB2 for a notice correspondence relationship, which is a correspondence relationship between the notice user identifier UID and the notice printer identifier PID. When the notice correspondence relationship is not found, the CPU 510 adds a notice correspondence relationship to the second data DB2. The CPU 510 decides the other information D2, NM and AD regarding the notice user to values associated in advance with the notice user identifier UID, respectively. The CPU 510 decides the cartridge stock CS to a predetermined initial value (for example, the number of each of all the cartridges is zero). When the notice correspondence relationship is found from the second data DB2, the CPU 510 does not change the second data DB2. In any case, the CPU 510 notifies the printer 100 of an end of the processing.

When the user authentication is not successful, the CPU 510 transmits data, which indicates an authentication failure, to the printer 100, although not shown. The CPU 110 of the printer 100 displays information, which indicates an authentication failure, on the display unit 140, and ends the processing of FIG. 4. The CPU 110 may prompt the user to input a new combination of the user identifier UID and the authentication key.

After S110, the CPU 110 of the printer 100 repeatedly executes determination processing of S120 and S140, which will be described later (for example, S120 and S140 are performed a plurality of times per day).

In S120, the CPU 110 determines whether the printer 100 has performed printing after the previous S120. When a determination result of S120 is Yes, in S130, the CPU 110 transmits remaining amount history data, which indicates information regarding an ink remaining amount of the printer 100, to the control server 500. In the present embodiment, the remaining amount history data indicates the notice printer identifier PID and the remaining amount of each printing material.

Although not shown, in the present embodiment, the printing execution unit 900 of the printer 100 (FIG. 1) has a remaining amount measuring device configured to measure a remaining amount of the printing material. The CPU 110 of the printer 100 transmits the remaining amount history data, which indicates a remaining amount of each color measured by the remaining amount measuring device, to the control server 500. The remaining amount measuring device may also be various devices configured to measure the remaining amount of the printing material. In a case where the printing execution unit 900 is an inkjet-type printer, the remaining amount measuring device may include, for example, a light source configured to irradiate an ink containing part of an ink cartridge (for example, a container chamber) with light, and an optical sensor configured to detect reflected light from the container chamber or transmitted light having transmitted through the container chamber. In a case where the printing execution unit 160 is a laser printer, the remaining amount measuring device may be, for example, a device configured to measure an electrostatic capacitance that changes according to a remaining amount of toner. In addition, the remaining amount measuring device may be omitted. In this case, the CPU 110 may calculate the remaining amount of each color by calculating an amount of the printing material used for printing. For example, the CPU 110 may calculate the remaining amount by subtracting a used amount of the printing material from a remaining amount (for example, 100%) in a state where a new cartridge of the printing material is attached.

S135 and S137 are processing that is performed by the control server 500 in response to reception of the remaining amount history data. The CPU 510 of the control server 500 executes the processing of S135 and S137, according to the program PG5. In S135, the CPU 510 updates, to the remaining amount indicated by the remaining amount history data, the remaining amount of each printing material of the consumable remaining amount A1 associated with the notice printer identifier PID, which is indicated by the remaining amount history data, of the first data DB1 (FIG. 2A).

Figure 5A:
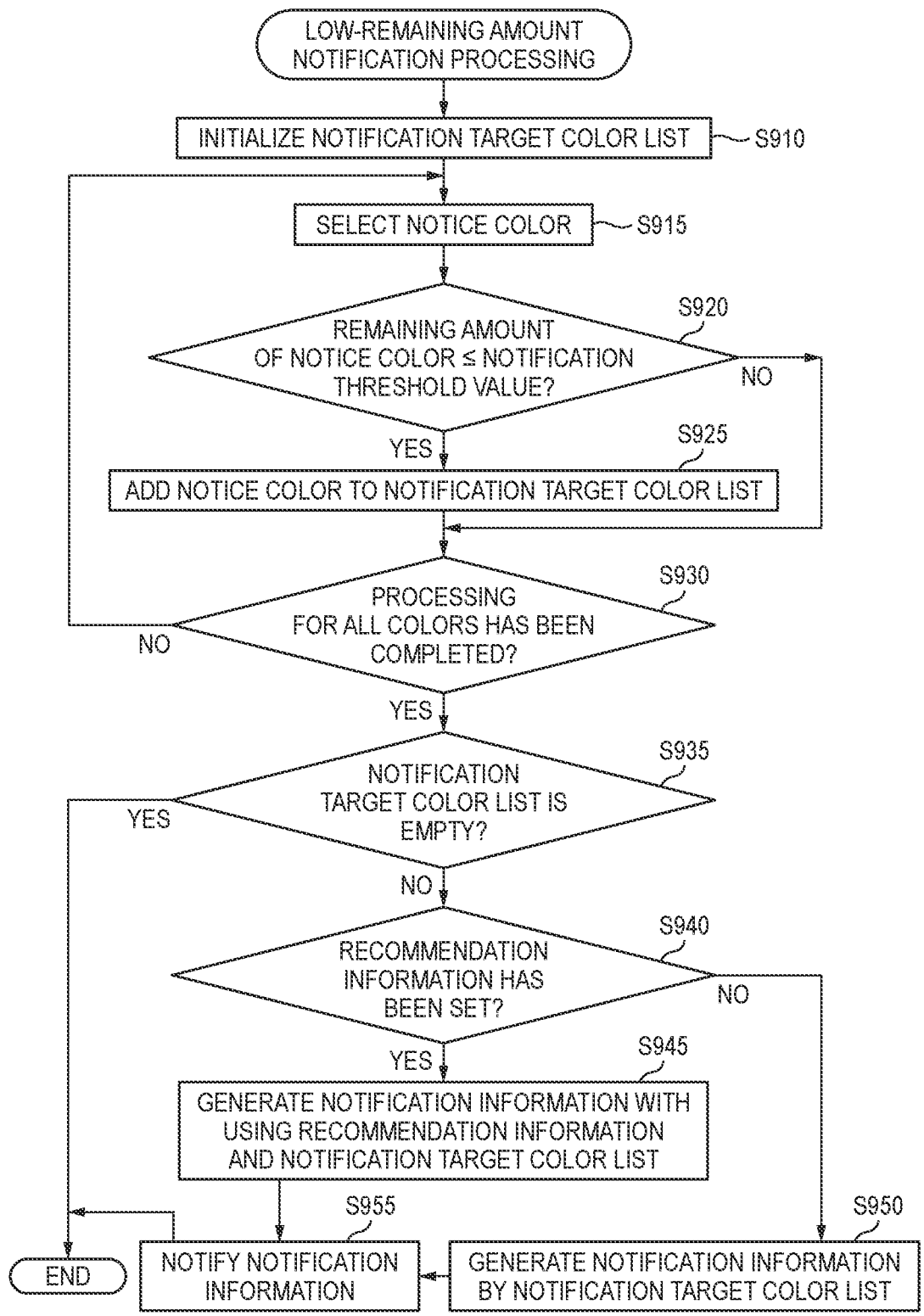
FIG. 5A is a flowchart showing an example of low-remaining amount notification processing.

In S137, the CPU 510 executes low-remaining amount notification processing. FIG. 5A is a flowchart showing an example of low-remaining amount notification processing. The low-remaining amount notification processing is processing of notifying the user of a low-remaining amount when the remaining amount is equal to or less than a notification threshold value. The notification threshold value is determined in advance, and is, for example, a value of 10% or more and 30% or less.

In S910, the CPU 510 of the control server 500 initializes a notification candidate color list to "empty".

In S915, the CPU 510 selects, as a notice color, an unprocessed color from the colors of the respective printing materials that can be used by the notice printer 100. In S920, the CPU 510 refers to the first data DB1 (FIG. 2A), and determines whether a remaining amount of the notice color, which is indicated by the consumable remaining amount A1 associated with the notice printer identifier PID, is equal to or less than the notification threshold value.

When the remaining amount of the notice color is equal to or less than the notification threshold value (S920: Yes), in S925, the CPU 510 adds the notice color to the notification candidate color list and proceeds to S930. When the remaining amount of the notice color is larger than the notification threshold value (S920: No), the CPU 510 skips S925 and proceeds to S930.

In S930, the CPU 510 determines whether the processing for all the printing materials (i.e., all the colors) that can be used by the notice printer has been completed. When an unprocessed color remains (S930: No), the CPU 510 proceeds to S915 and processes a new color.

When the processing for all the colors has been completed (S930: Yes), in S935, the CPU 510 determines whether the notification candidate color list is empty. When the notification candidate color list is empty (S935: Yes), the CPU 510 ends the processing of FIG. 5A, i.e., S137 of FIG. 4 without notifying the low-remaining amount.

When the notification candidate color list includes one or more colors (S935: No), in S940, the CPU 510 determines whether recommendation information is set. The recommendation information is information regarding purchase of a cartridge recommended for the notice user, such as purchase of "2 packs (FIG. 3B)", and can be set by "large capacity determination processing" and "multi-color set determination processing", which will be described later.

When the recommendation information is not set (S940: No), in S950, the CPU 510 uses the notification candidate color list to generate notification data indicating notification information. The notification information indicates that the remaining amount of each color in the notification candidate color list is low. In S955, the CPU 510 transmits the notification data to a terminal device (user terminal 200, in the present embodiment) associated in advance with the notice user identifier UID. The CPU 210 of the user terminal 200 notifies the user of the notification information, in response to reception of the notification data (in the present embodiment, the notification information is displayed on the display unit 240). The CPU 210 executes the notification processing by executing the program PG2.

Note that, although not shown, the user identifier UID is associated in advance with the identification information of the terminal device. For example, the second data DB2 (FIG. 2B) may further include data indicating identification information of the terminal device associated with the user identifier UID. The identification information of the terminal device may be any information that identifies the terminal device (for example, a serial number unique to the device, an IP address, a MAC address, and the like).

FIGS. 6A to 6E are schematic views showing examples of the notification information. In each figure, the display unit 240 of the user terminal 200 is shown. A first message MS1 is displayed on the display unit 240 of FIG. 6A. The first message MS1 indicates that the remaining amount of Black K is low. The first message MS1 is an example of the notification information generated in S950 (FIG. 5A). The CPU 210 is configured to display a message on the display unit 240 with using a message display function of an operating system operating on the user terminal 200. Instead of this, the program PG2 may realize a function to display a message on the display unit 240, as a function of an application operating on the background.

Figure 6A:
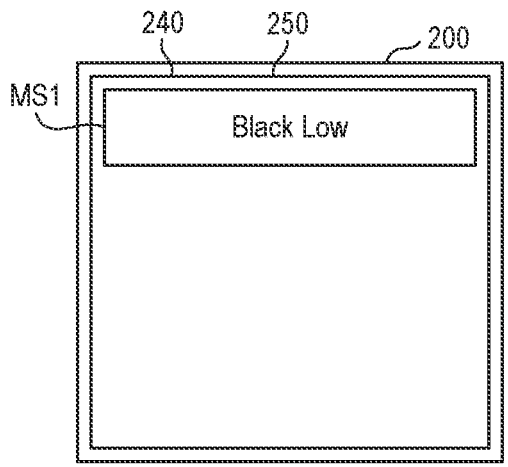
FIGS. 6A to 6E are schematic views showing examples of notification information.
Figure 6B:
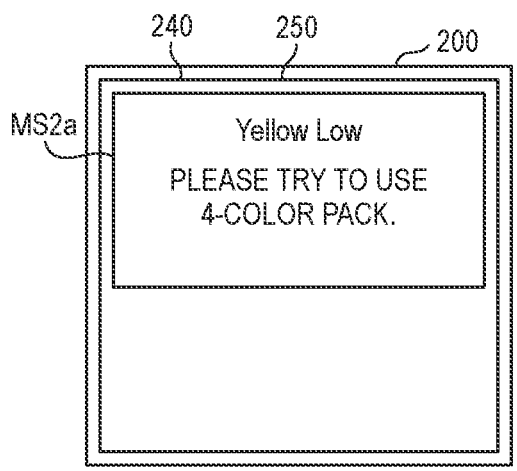

When the recommendation information is set (S940: Yes, in FIG. 5A), in S945, the CPU 510 generates notification data indicating notification information with using the recommendation information, in addition to the notification candidate color list. The notification information indicates information regarding the recommendation information, in addition to the low-remaining amount of each color in the notification candidate color list. Then, the CPU 510 proceeds to S955. Messages MS2a and MS3a in FIGS. 6B and 6D are examples of the notification information generated using the recommendation information. The message MS2a (FIG. 6B) indicates that the remaining amount of Yellow Y is low and that a 4-color pack is recommended. The message MS3a (FIG. 6D) indicates that the remaining amount of Black K is low and that a large-capacity cartridge is recommended. In the present embodiment, the display image can be operated by operating (for example, tapping, swiping, and the like) a part of the operation unit 250, which overlaps the display image (for example, message MS2a).

Figure 6C:
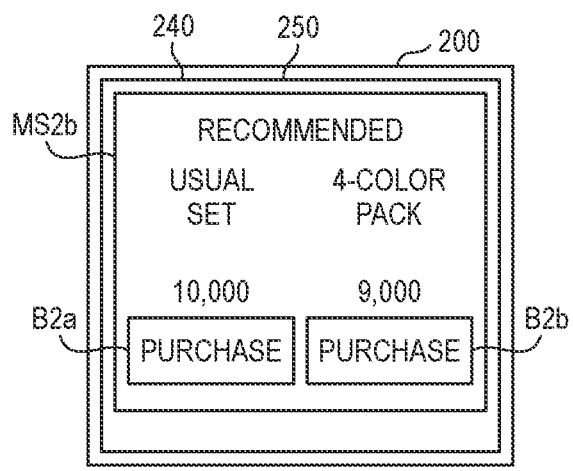
Figure 6D:
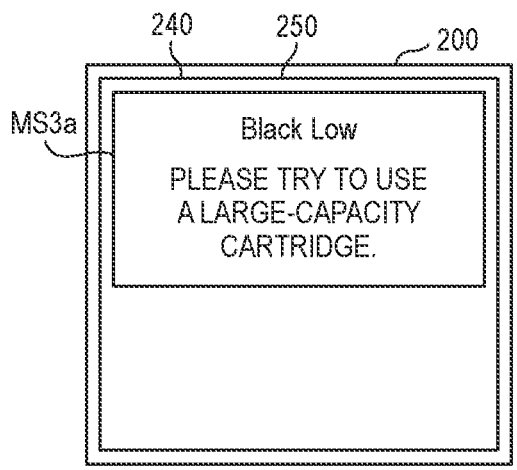

A message MS2b in FIG. 6C is an example of information that is displayed in response to tapping on the message MS2a (FIG. 6B). The message MS2b indicates a usual set purchase button B2a and a 4-color pack purchase button B2b. The user can start purchase processing by tapping any one of the purchase buttons B2a and B2b (which will be described later). Note that, the notification data (S945, S950) may include a command for displaying a message in two stages in this way.

Figure 6E:
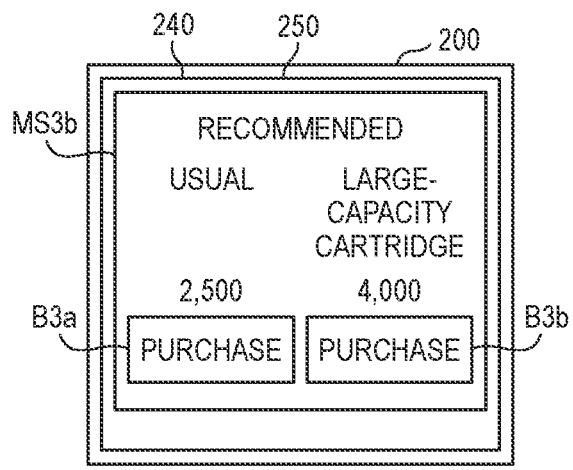

A message MS3b in FIG. 6E is an example of information that is displayed in response to tapping on the message MS3a (FIG. 6D). The message MS3b indicates a usual cartridge purchase button B3a and a large-capacity cartridge purchase button B3b. The user can start purchase processing by tapping any one of the purchase buttons B3a and B3b (which will be described later).

After S955, the CPU 510 of the control server 500 ends the processing of FIG. 5A, i.e., S137 of FIG. 4.

After S130 in FIG. 4, the CPU 110 of the printer 100 proceeds to S140. This proceeding is performed without waiting for the completion of S135 and S137. Instead of this, the CPU 510 of the control server 500 may transmit a completion notification to the printer 100 when S137 has been completed. Then, the CPU 110 of the printer 100 may proceed to S140, in response to reception of the completion notification.

When a determination result of S120 is No, the CPU 110 skips S130 (and further, S135 and S137) and proceeds to S140.

In S140, the CPU 110 determines whether the cartridge has been replaced after the previous S140. A method of determining whether the cartridge has been replaced may be any method. In the present embodiment, the CPU 110 determines that the cartridge has been replaced, when the remaining amount of the printing material has increased. Instead of this, the mounting unit 950 (FIG. 1) may have a switch configured to detect a cartridge (not shown). The CPU 110 may detect cartridge replacement with using a signal from the switch.

When it is determined that the cartridge has been replaced after the previous S140 (S140: Yes), in S150, the CPU 110 transmits replacement history data, which indicates information regarding the cartridge replacement, to the control server 500. In the present embodiment, the replacement history data indicates the notice user identifier UID, the notice printer identifier PID, a color (referred to as replaced color) of the printing material of the replaced cartridge, and a replacement date (date). The CPU 110 acquires the date at a time when the cartridge has been replaced, with using data from a timer (not shown) provided in the printer 100. When multiple cartridges have been replaced, the replacement history data indicates information regarding all the replaced cartridges.

The replacement registration processing of S155 is processing that is performed by the control server 500, in response to reception of the replacement history data. The CPU 510 of the control server 500 executes the processing of S155, according to the program PG5.

Figure 5B:
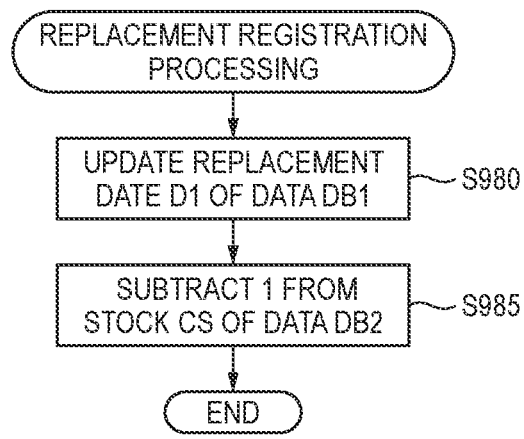
FIG. 5B is a flowchart showing an example of replacement registration processing.

FIG. 5B is a flowchart showing an example of the replacement registration processing. In S980, the CPU 510 updates the first data DB1 (FIG. 2A), based on the replacement history data. The CPU 510 updates a replacement date of the replaced color before last time among the cartridge replacement dates D1 associated with the notice printer identifier PID indicated by the replacement history data to the replacement date of the replaced color last time, and updates the replacement date of the replaced color last time to the replacement date indicated by the replacement history data.

In S985, the CPU 510 updates the second data DB2 (FIG. 2B), based on the replacement history data. The CPU 510 updates a replaced color stock among the cartridge stock CS associated with the combination of the notice user identifier UID and the notice printer identifier PID indicated by the replacement history data, to a value obtained by subtracting 1 from the value before the update.

Note that, when the replacement history data indicates information regarding a plurality of cartridges, the CPU 510 updates the information regarding each cartridge (i.e., each replaced color) in each of S980 and S985.

In response to the end of S985, the CPU 510 ends the processing of FIG. 5B, i.e., the processing of S155 of FIG. 4. After S150, the CPU 110 of the printer 100 proceeds to S120. This proceeding is performed without waiting for the completion of S155. Instead of this, the CPU 510 of the control server 500 may transmit a completion notification to the printer 100 when S155 has been completed. Then, the CPU 110 of the printer 100 may proceed to S120, in response to reception of the completion notification.

When a determination result of S140 is No, the CPU 110 skips S150 (and further, S155) and proceeds to S120.

Thereafter, the CPU 110 repeats the above-described processing. Thereby, the CPU 510 of the control server 500 can update the data DB1 and DB2 so that the data indicates the latest information.

Figure 7:
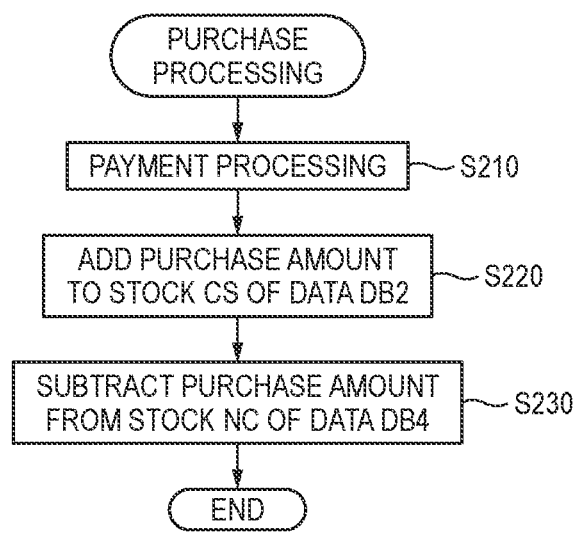
FIG. 7 is a flowchart showing an example of cartridge purchase processing.

A-4. Purchase Processing:

FIG. 7 is a flowchart showing an example of cartridge purchase processing. The purchase processing is performed according to a user's instruction. For example, when the purchase buttons B2a, B2b, B3a and B3b in FIGS. 6C and 6E are tapped, the cartridge purchase processing associated with the buttons is executed. Hereinafter, the user of the user terminal 200 is described as purchasing the cartridge.

In S210, the CPU 210 of the user terminal 200 transmits purchase instruction data to the control server 500, according to the program PG2. The purchase instruction data indicates a user identifier UID and purchase information. The purchase information includes purchase cartridge information, which is identification information of a cartridge to be purchased, and a purchase amount of cartridges. The CPU 510 of the control server 500 processes the purchase instruction data, according to the program PG5. In the present embodiment, the CPU 510 transmits the purchase instruction data to the sales site server 600. The sales site server 600 performs payment processing for purchase based on the purchase information by a method associated in advance with the user identifier UID indicated by the purchase instruction data (for example, a credit card associated with the user identifier UID is used for payment). In addition, although not shown, the sales site server 600 executes processing (for example, transmission of shipping instruction data to a computer of a shipping facility) for shipping a purchased product to the address AD (FIG. 2B) associated with the user identifier UID.

In S220, the CPU 510 of the control server 500 updates the second data DB2 (FIG. 2B) with using the purchase instruction data. The CPU 510 refers to the cartridge stock CS associated with a combination of the user identifier UID indicated by the purchase instruction data and the possessed printer UPID indicating the printer associated in advance with the purchase cartridge information. Then, the CPU 510 updates the stock, which corresponds to the purchase cartridge information, of the cartridge stock CS to a value obtained by adding the purchase amount to the value before the update.

In S230, the CPU 510 updates the fourth data DB4 (FIG. 3B) with using the purchase instruction data. The CPU 510 updates the stocked amount NC associated with the product name N32 of the purchase cartridge information to a value obtained by subtracting the purchase amount from the value before the update.

After S230, the CPU 510 ends the processing of FIG. 7. By the processing of FIG. 7, the CPU 510 can update the data DB2 and DB4 so that the data indicates the latest information.

Figure 8A:
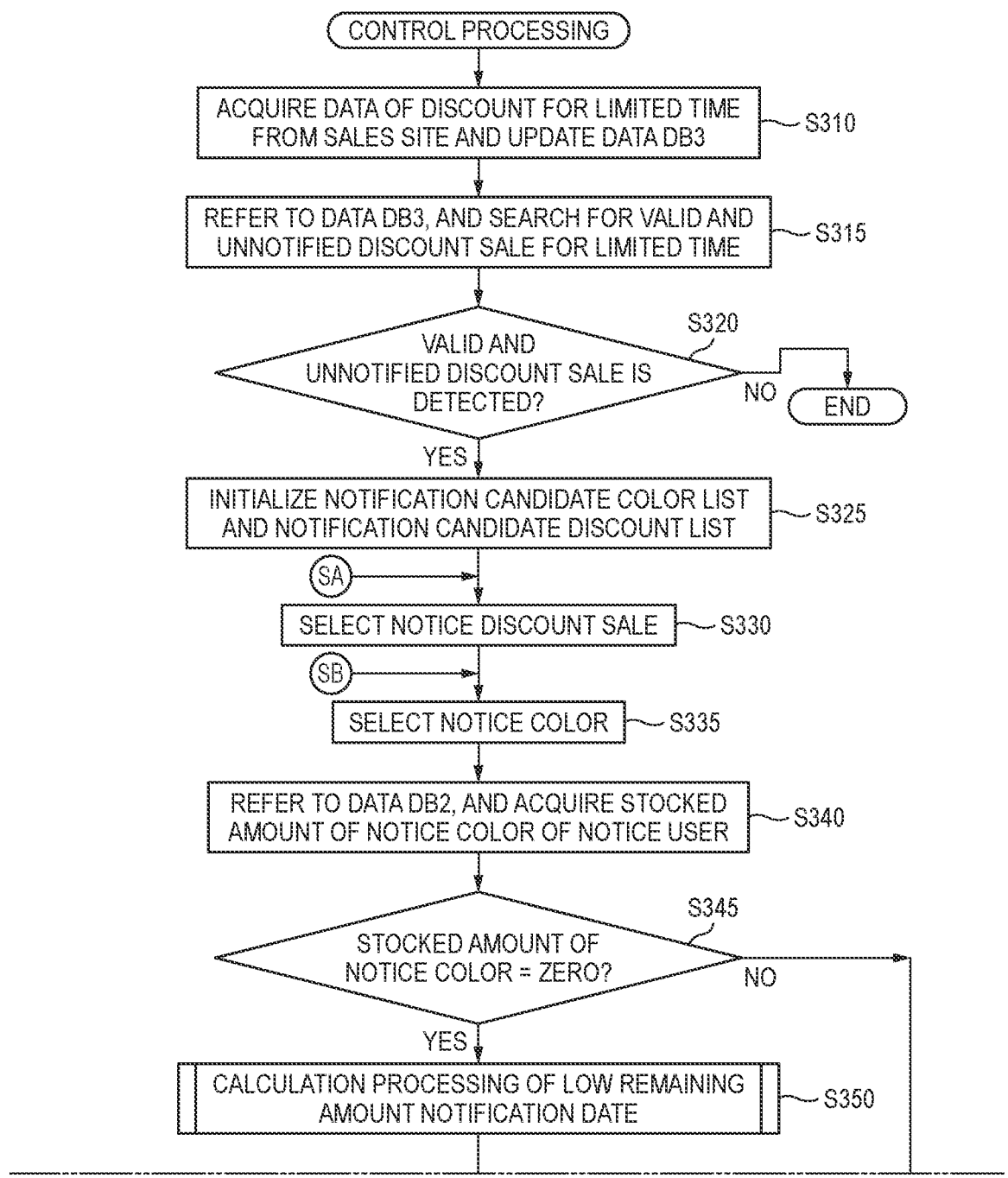
FIGS. 8A and 8B are flowcharts showing an example of control processing of controlling a notification.
Figure 8B:
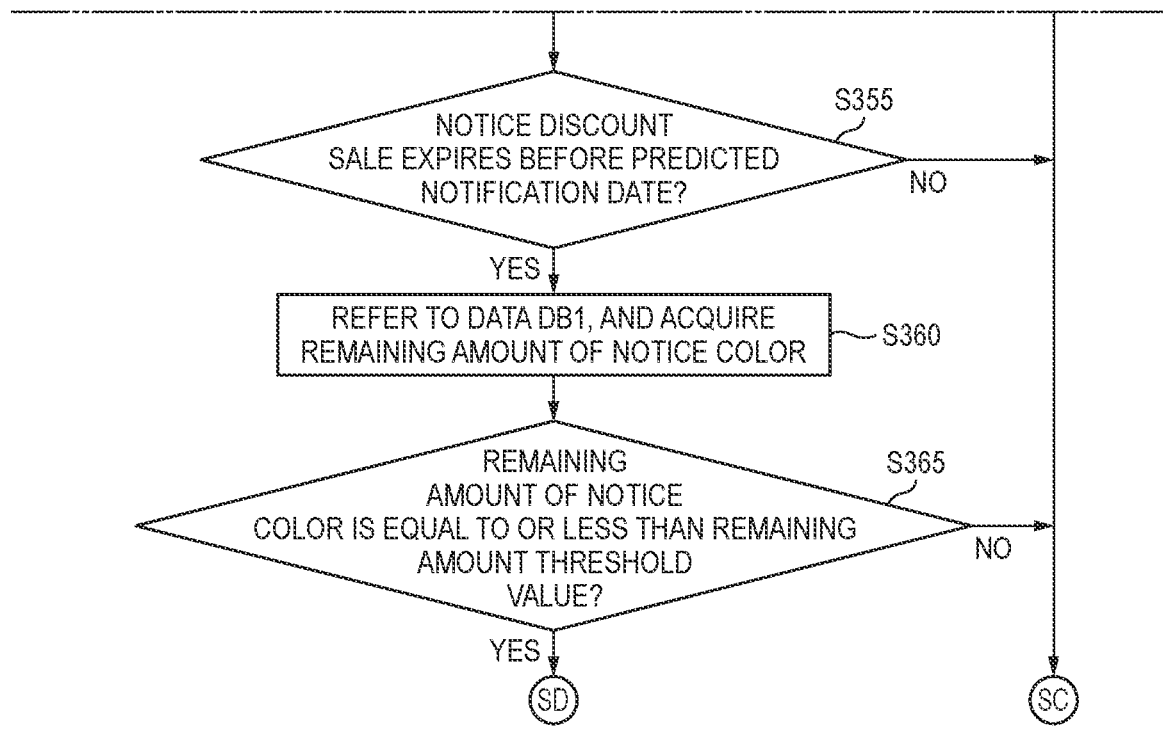
Figure 9:
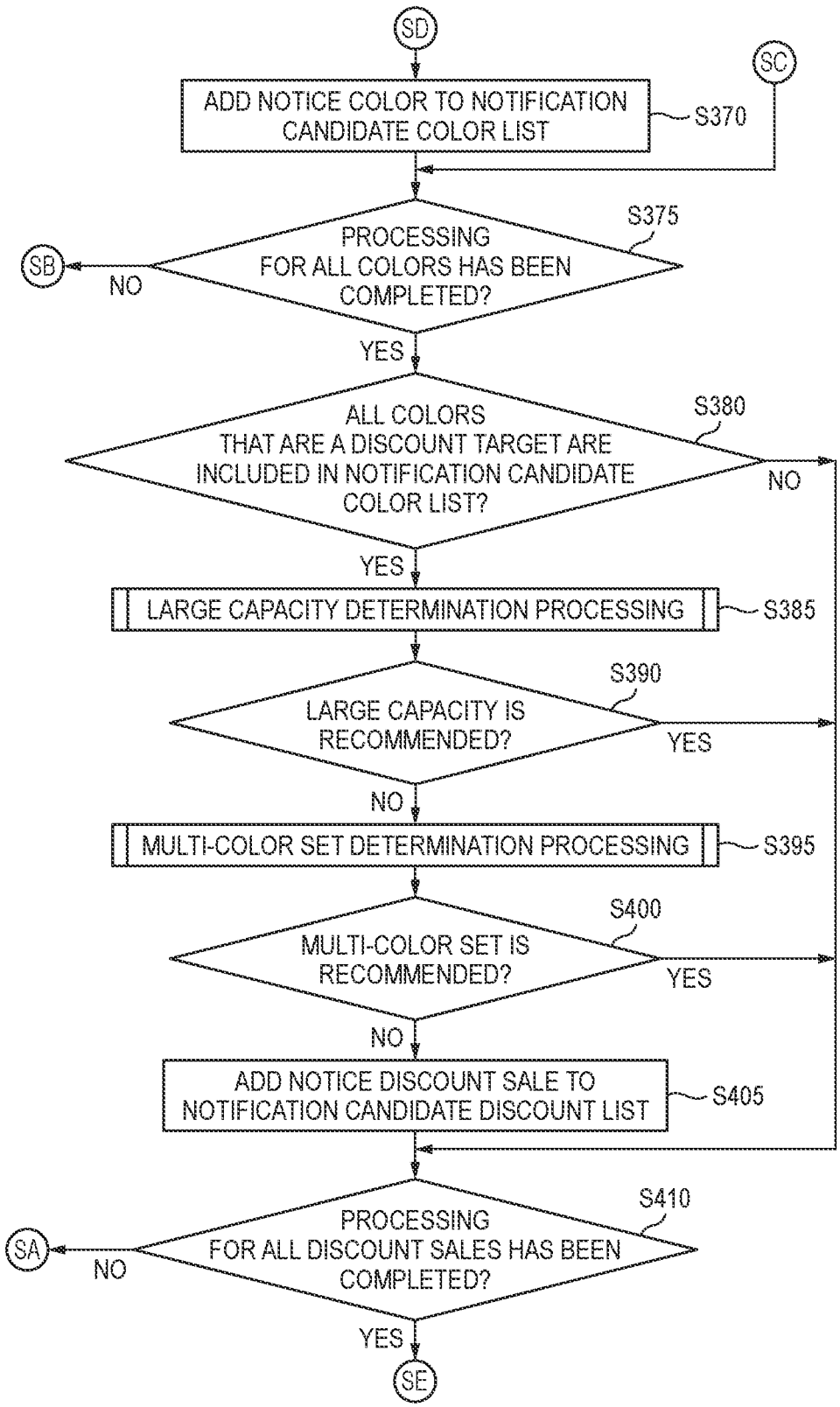
FIG. 9 is a flowchart showing an example of control processing of controlling a notification.
Figure 10:
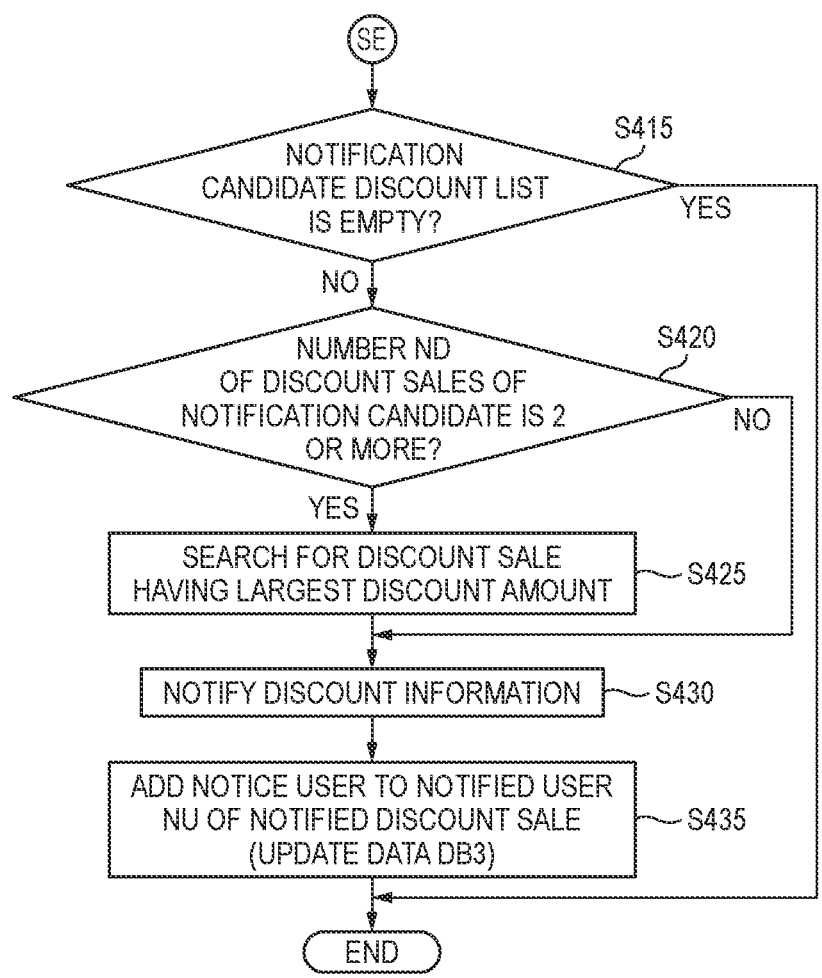
FIG. 10 is a flowchart showing an example of control processing of controlling a notification.

A-5. Control Processing:

FIGS. 8A to 10 are flowcharts showing an example of control processing of controlling a notification. FIG. 9 shows processing continuing to FIG. 8A, and FIG. 10 shows processing continuing to FIG. 9. In the present embodiment, the CPU 510 of the control server 500 repeatedly executes the control processing, according to the program PG5 (for example, once a day). In addition, the CPU 510 executes the control processing for each of the plurality of printer identifiers PIDs. Here, the control processing is described, assuming that the printer 100 is a target of the control processing. Hereinafter, the printer identifier PID, which is a target of the control processing, is referred to as a notice printer identifier PID, and the printer associated with the notice printer identifier PID is referred to as a notice printer. Further, the user identifier UID of the owner of the printer associated with the notice printer identifier PID is also referred to as a notice user identifier UID, and the user associated with the notice user identifier UID is also referred to as a notice user.

In S310, the CPU 510 requests the sales site server 600 for information regarding discount sale. In response to the request, the sales site server 600 transmits discount sale data, which indicates the latest information regarding the discount sale, to the control server 500. The discount sale data indicates the information N31, N32, R3, D31 and D32 in FIG. 3A. The CPU 510 updates the third data DB3, based on the discount sale data. Thereby, the CPU 510 adds the information regarding the new discount sale to the third data DB3, and deletes the information regarding the terminated discount sale from the third data DB3.

In S315, the CPU 510 refers to the third data DB3 to search for valid and unnotified discount sale. In a case where the current date is within a period from the delivery start date D31 to the expiration date D32, the discount sale is valid. In addition, in a case where the notified user NU does not include the notice user identifier UID, the discount sale is not notified yet. Note that, the CPU 510 refers to the second data DB2 (FIG. 2B) and acquires the user identifier UID associated with the notice printer identifier PID, as the notice user identifier UID.

In S320, the CPU 510 determines whether a valid and unnotified discount sale has been detected. When such a discount sale is not detected (S320: No), the CPU 510 ends the control processing.

When one or more discount sales are detected (S320: Yes), in S325, the CPU 510 initializes the notification candidate color list to "empty" and initializes the notification candidate discount list to "empty".

In S330, the CPU 510 selects, as a notice discount sale, an unprocessed discount sale from the discount sale detected in S315. In S335, the CPU 510 selects, as a notice color, an unprocessed color from the colors of the printing materials that are used by the notice printer 100. When the notice printer 100 is a color printer, the notice color is selected from CMYK. When the notice printer is a monochrome printer, the notice color is Black K.

In S340, the CPU 510 refers to the data DB2 (FIG. 2B) and acquires the stocked amount of the notice color from the cartridge stock CS associated with the notice user identifier UID.

In S345, the CPU 510 determines whether the stocked amount of the notice color is zero. When the stocked amount of the notice color is zero (S345: Yes), in S350, the CPU 510 executes calculation processing of a low-remaining amount notification date. The low-remaining amount notification is the notification that is performed in S137 of FIG. 4.

Figure 11:
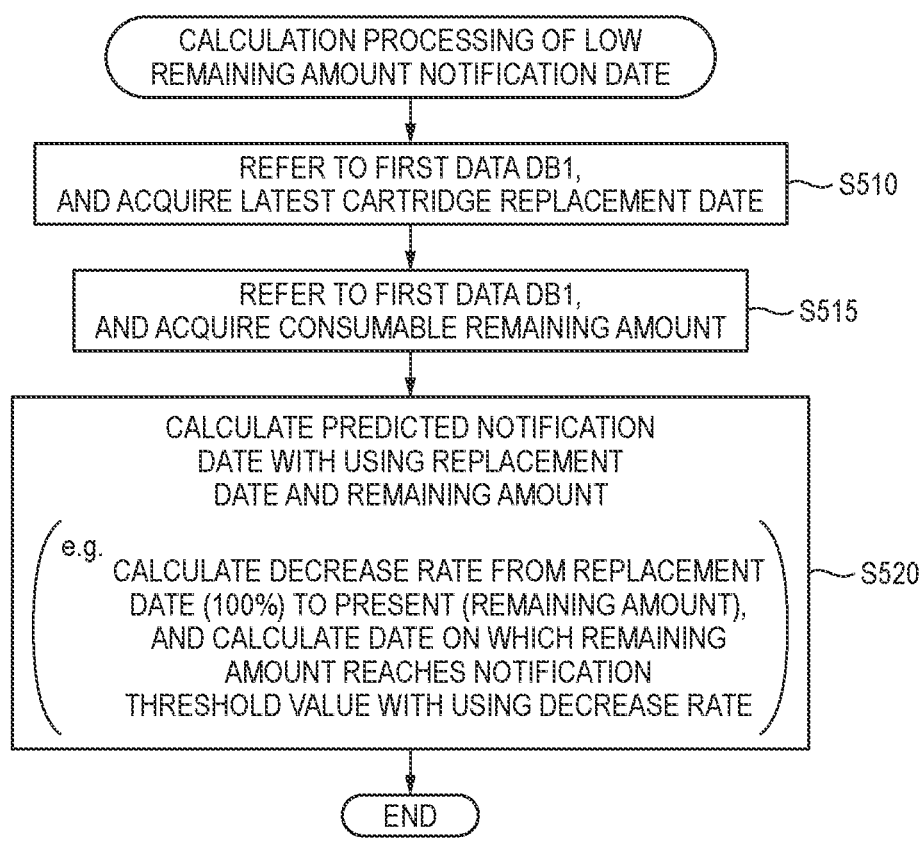
FIG. 11 is a flowchart showing an example of calculation processing of a low-remaining amount notification date.

FIG. 11 is a flowchart showing an example of calculation processing of a low-remaining amount notification date. In S510, the CPU 510 refers to the cartridge replacement date D1 of the first data DB1 (FIG. 2A), and acquires a latest cartridge replacement date of the notice color (in the present embodiment, a replacement date last time), which is a replacement date associated with the notice printer identifier PID. In S515, the CPU 510 refers to the consumable remaining amount A1 of the first data DB1 and acquires a current remaining amount of the notice color, which is a remaining amount associated with the notice printer identifier PID.

In S520, the CPU 510 uses the replacement date and the remaining amount to calculate a date on which a low-remaining amount notification is predicted to be executed (hereinafter, referred to as a predicted notification date). In the present embodiment, the CPU 510 uses the latest replacement date and the remaining amount (i.e., 100%) on the replacement date, and the current date and the current remaining amount to calculate a decrease rate of the remaining amount (decrease rate=(100%−current remaining amount)/(current date−latest replacement date)). The CPU 510 calculates number of days for the remaining amount to reach the notification threshold value (S920 in FIG. 5A) on the assumption that the remaining amount decreases at the decrease rate (number of days=(current remaining amount−notification threshold value)/decrease rate). The CPU 510 calculates a predicted notification date by adding the calculated number of days to the current date. Then, the CPU 510 ends the processing of FIG. 11, i.e., S350 of FIG. 8A.

In S355 of FIG. 8B, the CPU 510 refers to the third data DB3 (FIG. 3A) and acquires the expiration date D32 of the notice discount sale. Then, the CPU 510 determines whether the notice discount sale expires before the predicted notification date.

When the notice discount sale expires before the predicted notification date (S355: Yes), in S360, the CPU 510 acquires a current remaining amount of the notice color. The processing of S360 is the same as the processing of S515 of FIG. 11.

In S365, the CPU 510 determines whether the remaining amount of the notice color is equal to or less than a predetermined remaining amount threshold value. The remaining amount threshold value is decided so that, when the user purchases a new cartridge of the notice color in a state where the remaining amount of the notice color is equal to or less than the remaining amount threshold value, the use of the new cartridge will start in the near future (for example, before the expiration date of the cartridge). The remaining amount threshold value may be the same as the notification threshold value (S920 in FIG. 5A) and may be larger than the notification threshold value. The remaining amount threshold value may be, for example, a value of 20% or more and 80% or less.

When the remaining amount of the notice color is equal to or less than the remaining amount threshold value (S365: Yes), in S370 of FIG. 9, the CPU 510 adds the notice color to the notification candidate color list. Then, the CPU 510 proceeds to S375.

When a determination result in any one of the three steps S345, S355 and S365 is No, the CPU 510 skips S370 (FIG. 9) and proceeds to S375.

In S375, the CPU 510 determines whether the processing for all the colors of the printing materials that are used by the notice printer 100 has been completed. When an unprocessed color remains (S375: No), the CPU 510 proceeds to S335 of FIG. 8A and performs processing for a new color.

When the processing for all the colors has been completed (S375: Yes), in S380, the CPU 510 determines whether all colors of discount targets (i.e., all cartridges of discount targets) of the notice discount sale are included in the notification candidate color list. When a determination result in S380 is Yes, in S385, the CPU 510 executes large capacity determination processing.

Figure 12:
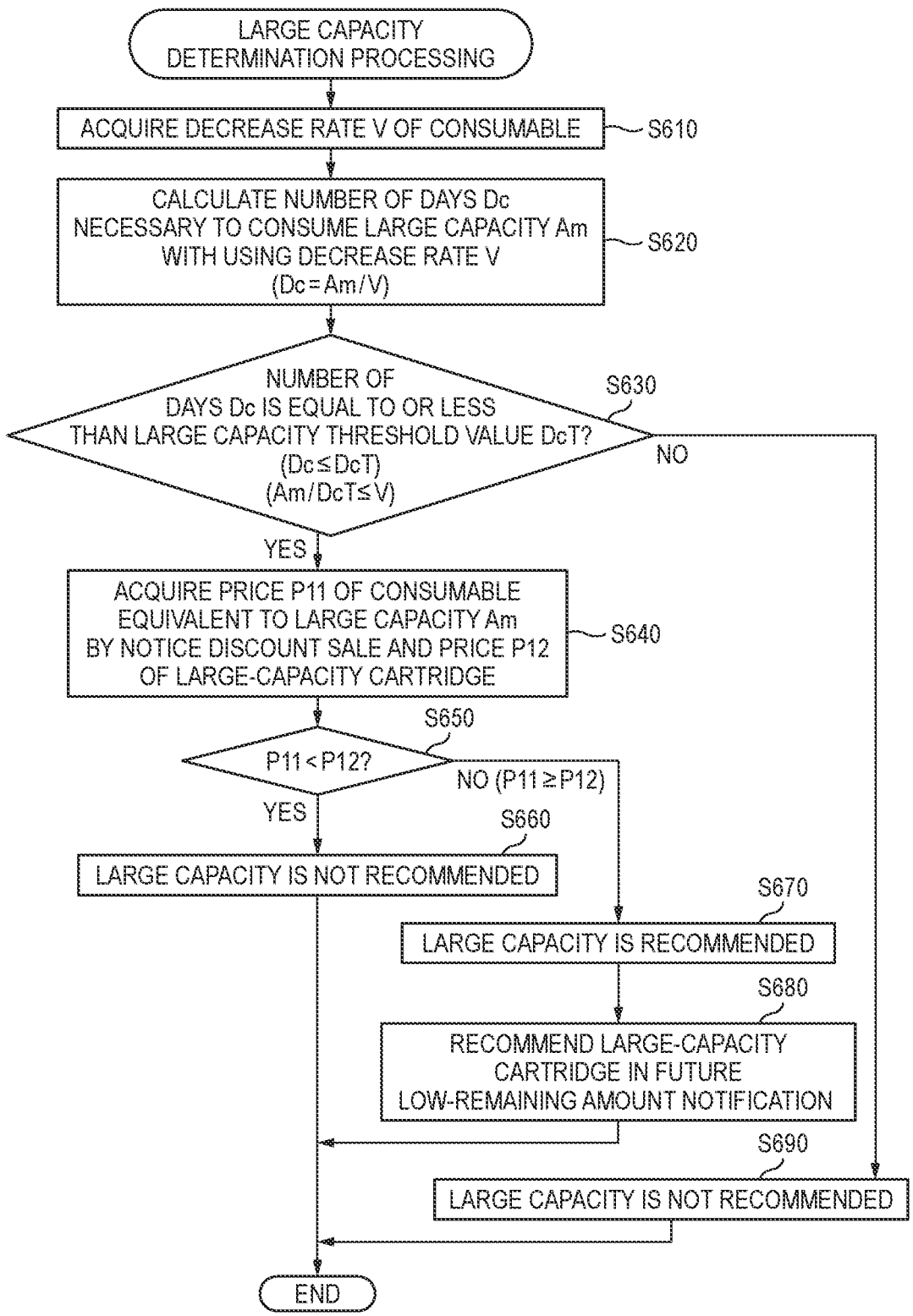
FIG. 12 is a flowchart showing an example of large capacity determination processing.

FIG. 12 is a flowchart showing an example of large capacity determination processing. The large capacity determination processing is processing of determining whether to recommend purchase of a large-capacity cartridge, rather than cartridge purchase by the notice discount sale. In S610, the CPU 510 calculates a decrease rate V of the remaining amount for each of all the colors of discount targets of the notice discount sale. A calculation method of the decrease rate V is the same as the calculation method described in S520 of FIG. 11. In S610, the CPU 510 may reuse the decrease rate calculated in S520 of FIG. 11, without calculating the decrease rate V. Hereinafter, the color of the discount target of the notice discount sale is also referred to as a discount target color.

In S620, the CPU 510 uses the decrease rate V to calculate a number of days Dc necessary to consume a large capacity Am, which is a capacity of the large-capacity cartridge (Dc=Am/V). The number of days Dc is calculated for each discount target color. In the present embodiment, the large capacity Am is 200%.

In S630, the CPU 510 determines whether a consumption condition that the number of days Dc is equal to or less than a predetermined large capacity threshold value DcT is satisfied. The consumption condition indicates that the decrease rate V of the remaining amount is so fast that a large-capacity cartridge is recommended rather than a usual cartridge. A situation that the number of days Dc is equal to or less than the large capacity threshold value DcT indicates that the decrease rate V is equal to or more than a predetermined rate threshold value (=Am/DcT). The large capacity threshold value DcT is preferably equal to or less than the number of days of an expiration date of the large-capacity cartridge. The number of days of the expiration date is the number of days decided in conformity to the large-capacity cartridge, and for example, any one of the number of days from a manufacturing date, the number of days from an opening date, and the number of days from a replacement date may be adopted. In addition, it is preferable that the large capacity threshold value DcT is large. The large capacity threshold value DcT may be, for example, a value of 100 days or more and 700 days or less. In the present embodiment, when one or more discount target colors satisfy the consumption condition, a determination result in S630 is Yes. Hereinafter, the discount target color that satisfies the consumption conditions is also referred to as a large capacity recommended color.

When all the discount target colors do not meet the consumption condition (S630: No), the CPU 510 determines that the purchase of a large-capacity cartridge is not recommended (S690), and ends the processing of FIG. 12, i.e., the processing of S385 of FIG. 9.

When one or more discount target colors satisfy the consumption condition (S630: Yes), in S640, the CPU 510 calculates a number Q of usual cartridges for replenishing the same amount of printing material as the large capacity Am. In the present embodiment, the large capacity Am is twice as large as a usual capacity, which is a capacity of the usual cartridge. Therefore, the number Q is "2". Then, the CPU 510 refers to the third data DB3 (FIG. 3A), and acquires a price P11 (referred to as a discount price P11) when purchasing Q cartridges through the notice discount sale. In addition, the CPU 510 refers to the fourth data DB4 (FIG. 3B), and acquires a price P12 of the large-capacity cartridge (referred to as a large capacity price P12). The CPU 510 acquires the prices P11 and P12 for each large capacity recommended color.

Note that, the large capacity Am may not be an integral multiple of the usual capacity. For example, the large capacity Am may be 1.5 times as large as the usual capacity. In this case, the number Q is 1.5. Thus, the number Q may be a non-integer value. In a case where the number Q is not an integer, as the discount price P11, a value obtained by multiplying a price when purchasing one usual cartridge through the notice discount sale by the number Q may be adopted. In this way, as the discount price P11, a price corresponding to the large capacity Am based on the price by the discount sale of the printing material of a usual capacity (i.e., a price obtained by multiplying the price by the discount sale of the printing material of a usual capacity by a ratio (large capacity Am/usual capacity)) may be adopted.

In S650, the CPU 510 determines whether a discount recommendation condition that the discount price P11 is lower than the large capacity price P12 is satisfied. In the present embodiment, when all the large capacity recommended colors satisfy the discount recommendation condition, a determination result in S650 is Yes. When one or more large capacity recommended colors do not satisfy the discount recommendation condition, a determination result in S650 is No.

When one or more large capacity recommended colors do not satisfy the discount recommendation condition (S650: No), in S670, the CPU 510 determines that purchase of a large-capacity cartridge is recommended. In S680, the CPU 510 sets recommendation information, which indicates that purchase of a large-capacity cartridge is recommended, for the large capacity recommended color that does not meet the discount recommendation condition. The recommendation information is used in S940 and S945 of the future low-remaining amount notification processing (FIG. 5A). Then, the CPU 510 ends the processing of FIG. 12, i.e., the processing of S385 of FIG. 9.

For example, it is assumed that the notice discount sale is a discount sale of the usual cartridge CK of Black K and Black K is included in the notification candidate color list (S380: Yes in FIG. 9). In addition, it is assumed that the number of days Dc is equal to or less than the large capacity threshold value DcT (S630: Yes in FIG. 12) and the discount price P11 is equal to or more than the large capacity price P12 (S650: No in FIG. 12) with respect to Black K. In this case, in S680, the CPU 510 sets recommendation information, which indicates that purchase of a large-capacity cartridge of Black K is recommended. The message MS3a in FIG. 6D is an example of a notification based on such recommendation information.

When all the large capacity recommended colors satisfy the discount recommendation condition (S650: Yes), the CPU 510 determines that the purchase of the large-capacity cartridge is not recommended (S660), and ends the processing of FIG. 12, i.e., the processing of S385 of FIG. 9.

Figure 13:
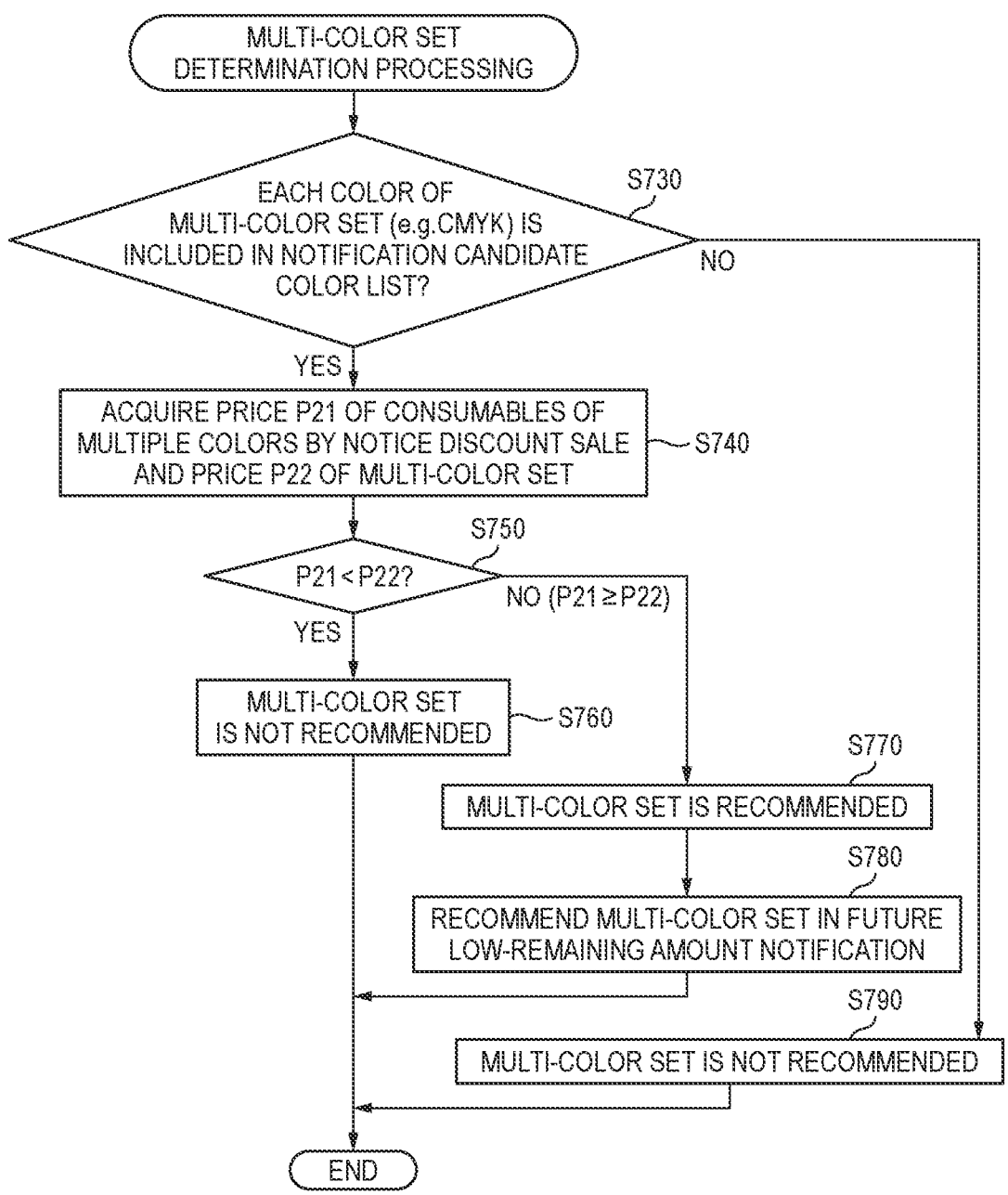
FIG. 13 is a flowchart showing an example of multi-color set determination processing.

After S385 (FIG. 9), in S390, the CPU 510 determines whether purchase of a large-capacity cartridge is recommended, based on the result of S385. When purchase of a large-capacity cartridge is not recommended (S390: No), in S395, the CPU 510 executes multi-color set determination processing. FIG. 13 is a flowchart showing an example of multi-color set determination processing. The multi-color set determination processing is processing of determining whether to recommend purchase of a set of a plurality of colors of cartridges, rather than cartridge purchase by the notice discount sale. Hereinafter, a set of a plurality of colors of cartridges is also referred to as a multi-color set. In the present embodiment, the 4-color pack (FIG. 3B) is an example of the multi-color set.

In S730, the CPU 510 determines whether each color of the multi-color set (each color of CMYK, in the present embodiment) is included in the notification candidate color list. When one or more colors of the multi-color set are not included in the notification candidate color list (S730: No), the CPU 510 determines that purchase of the multi-color set is not recommended (S790), and ends the processing of FIG. 13, i.e., the processing of S395 of FIG. 9.

When each color of the multi-color set is included in the notification candidate color list (S730: Yes), in S740, the CPU 510 refers to the third data DB3 (FIG. 3A), and acquires a price P21 (referred to as a discount price P21) when purchasing each cartridge of the multi-color set through the notice discount sale. Further, the CPU 510 refers to the fourth data DB4 (FIG. 3B), and acquires a price P22 (referred to as a set price P22) of the multi-color set.

In S750, the CPU 510 determines whether the discount price P21 is lower than the set price P22. When the discount price P21 is equal to or higher than the set price P22 (S750: No), in S770, the CPU 510 determines that purchase of the multi-color set is recommended. In S780, the CPU 510 sets recommendation information, which indicates that purchase of the multi-color set is recommended. The recommendation information is used in S940 and S945 of the future low-remaining amount notification processing (FIG. 5A). Then, the CPU 510 ends the processing of FIG. 13, i.e., the processing of S395 of FIG. 9.

For example, it is assumed that the notice discount sale is a discount sale of the usual ink cartridge of Yellow Y and the four colors of CMYK are included in the notification candidate color list (S380: Yes in FIG. 9, S730: Yes in FIG. 13). In this case, the discount price P21 is a sum of three usual prices of the three usual cartridges CC, CM and CK of CMK and a discount price of the usual ink cartridge CY of Y. The set price P22 is a usual price of the 4-color pack. Here, when the discount price P21 is equal to or higher than the set price P22 (S750: No in FIG. 12), in S780, the CPU 510 sets recommendation information, which indicates that purchase of the multi-color set is recommended. The message MS2a in FIG. 6B is an example of a notification based on such recommendation information.

When the discount price P21 is lower than the set price P22 (S750: Yes), the CPU 510 determines that purchase of the multi-color set is not recommended (S760), and ends the processing of FIG. 13, i.e., the processing of S395 of FIG. 9.

After S395 (FIG. 9), in S400, the CPU 510 determines whether the purchase of the multi-color set is recommended, based on the result of S395. When the purchase of the multi-color set is not recommended (S400: No), the CPU 510 adds the notice discount sale to the notification candidate discount list in S405, and proceeds to S410.

When any of the determination results of "S380: No", "S390: Yes", and "S400: Yes" is obtained, the CPU 510 skips S405 and proceeds to S410.

In S410, the CPU 510 determines whether all the processing of the discount sale detected in S315 (FIG. 8A) has been completed. When an unprocessed discount sale remains (S410: No), the CPU 510 proceeds to S330 (FIG. 8A), and performs processing relating to a new discount sale.

When the processing relating to all the discount sales has been completed (S410: Yes), in S415 (FIG. 10), the CPU 510 determines whether the notification candidate discount list is empty. When the notification candidate discount list includes one or more discount sales (S415: No), in S420, the CPU 510 determines whether the number ND of discount sales of the notification candidate (i.e., discount sales included in the notification candidate discount list) is 2 or more.

When the number ND is 2 or more (S420: Yes), in S425, the CPU 510 searches for a discount sale, which indicates a discount sale having the largest discount amount among the ND discount sales, and adopts the found discount sale as a discount sale to be notified. Here, a discount amount for the same amount of printing material (for example, a discount amount per one usual cartridge) is compared. Then, the CPU 510 proceeds to S430.

When the number ND is 1 (S420: No), the CPU 510 skips S425 and proceeds to S430. In this case, the CPU 510 adopts one discount sale of the notification candidate discount list, as a discount sale to be notified.

In S430, the CPU 510 transmits discount information data, which indicates discount information regarding the discount sale to be notified, to the terminal device (user terminal 200, in the present embodiment) associated in advance with the notice user identifier UID. The CPU 210 of the user terminal 200 notifies the user of the discount information, in response to reception of the discount information data (in the present embodiment, the discount information is displayed on the display unit 240). An example of the discount information to be displayed will be described later.

In S435, the CPU 510 adds the notice user identifier UID to the notified user NU of the notified discount sale (i.e., a discount sale to be notified) of the third data DB3 (FIG. 3A). Then, the CPU 510 ends the control processing of FIGS. 8A to 10.

A-6. Processing Example by Control Processing

Figure 14A:
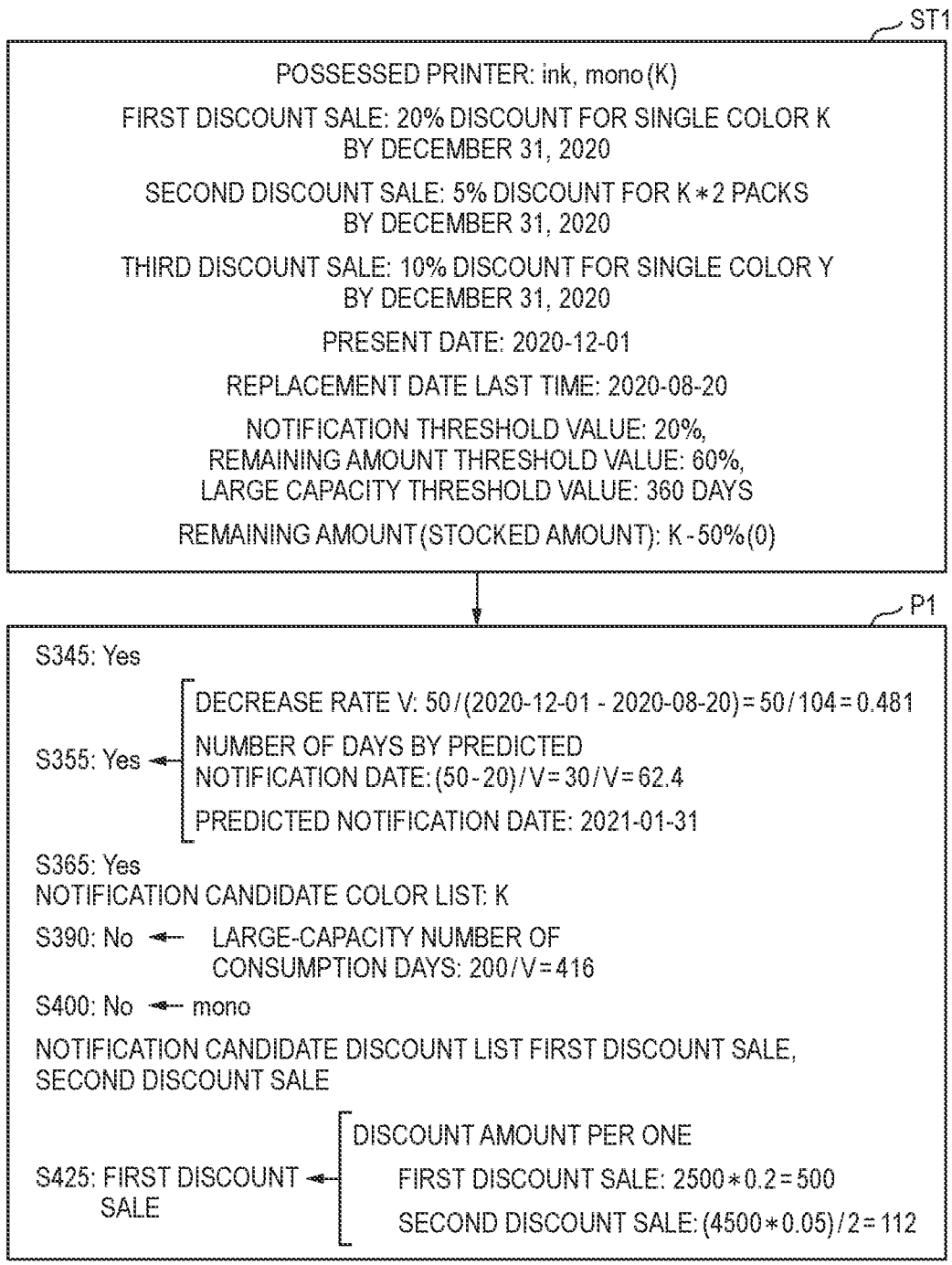
FIGS. 14A to 14C are schematic views showing a processing example by control processing.
Figure 14B:
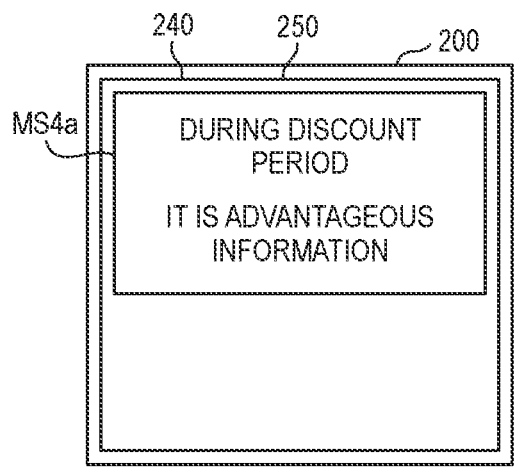
Figure 14C:
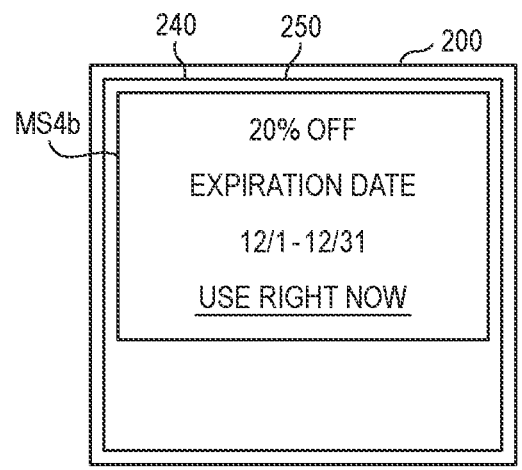

FIGS. 14A to 14C are schematic views showing a processing example by control processing. FIG. 14A shows a first situation ST1 and a processing example P1 proceeding under the first situation ST1. In the first situation ST1, the notice user possesses a monochrome inkjet-type printer using ink of Black K. Three discount sales are valid (each expiration date is Dec. 31, 2020). The first discount sale and the second discount sale are discount sales of the cartridge of Black K, and the third discount sale is a discount sale of the cartridge of Yellow Y. The current date is Dec. 1, 2020. The replacement date last time is Aug. 20, 2020. The notification threshold value is 20%, the remaining amount threshold value is 60%, and the large capacity threshold value is 360 days. In the figure, the color, the remaining amount, and the stocked amount (in parenthesis) are shown. In the first situation ST1, the remaining amount of Black K is 50%, and the stocked amount of Black K is zero. Note that, the stocked amount is the number of cartridges possessed by the notice user.

In the processing example P1, contents of various steps of the control processing are shown. Since the stocked amount of Black K is zero, a determination result of S345 (FIG. 8A) for Black K is Yes. In S350, the predicted notification date is calculated as follows. The number of days from the replacement date last time to the present is 104 days. During this period, the remaining amount has decreased from 100% to 50%. Therefore, the decrease rate V is 50/104=0.481 (%/day). At this decrease rate V, the number of days necessary for the remaining amount to decrease from the current remaining amount (50%) to the notification threshold value (20%) is (50−20)/V=62.4 days. The predicted notification date is Jan. 31, 2021 obtained by adding 62.4 days to the current date (Dec. 1, 2020). For any of the discount sales, the predicted notification date is later than the expiration date, and therefore, the determination result of S355 (FIG. 8B) is Yes. As for Black K, the remaining amount (50%) is equal to or less than the remaining amount threshold value (60%), so that the determination result of S365 (FIG. 8B) is Yes. From the above, the notification candidate color list shows Black K.

The number of days Dc calculated in S385 of FIG. 9 (specifically, S620 of FIG. 12) is Am/V=200/V=416. Since Dc>DcT, the determination result of S630 (FIG. 12) is No, and the determination result of S390 (FIG. 9) is No. Further, since the notice printer is a monochrome printer, the notification candidate color list shows only Black K. Therefore, the determination result of S730 of FIG. 13 executed in S395 of FIG. 9 is No, and the determination result of S400 (FIG. 9) is No. From the above, the first discount sale and the second discount sale relating to Black K are included in the notification candidate discount list (S405 in FIG. 9).

In S425 of FIG. 10, the CPU 510 calculates a discount amount of each of the two discount sales. In the present processing example, it is assumed that the CPU 510 compares the discount amount per one usual cartridge. Here, it is assumed that the price of the usual cartridge of Black K is 2500 Yen and the price of 2 packs of Black K is 4500 Yen. The first discount sale is a 20% discount for a single color, so that the discount amount is 2500*0.2=500 Yen. The second discount sale is a 5% discount for 2 packs, so that the discount amount is (4500*0.05)=112 Yen. Therefore, in S425 (FIG. 10), the CPU 510 adopts the first discount sale indicating the largest discount amount, as a notification target.

FIGS. 14B and 14C are examples of the discount information notified in S430 (FIG. 10). In each figure, the display unit 240 of the user terminal 200 is shown. A first message MS4*a* is displayed on the display unit 240 of FIG. 14B. The message MS4*a* proposes discount information for a limited time. A message MS4*b* in FIG. 14C is an example of information that is displayed in response to tapping on the message MS4*a* (FIG. 14A). The message MS4*b* indicates that a discount sale of 20% OFF will be offered from December 1 to December 31. The user can start the purchase processing by discount sale by tapping the message MS4*b*. The discount information data transmitted from the control server 500 to the user terminal 200 in S430 (FIG. 10) may include a command for displaying a message in two stages in this way.

Figure 15:
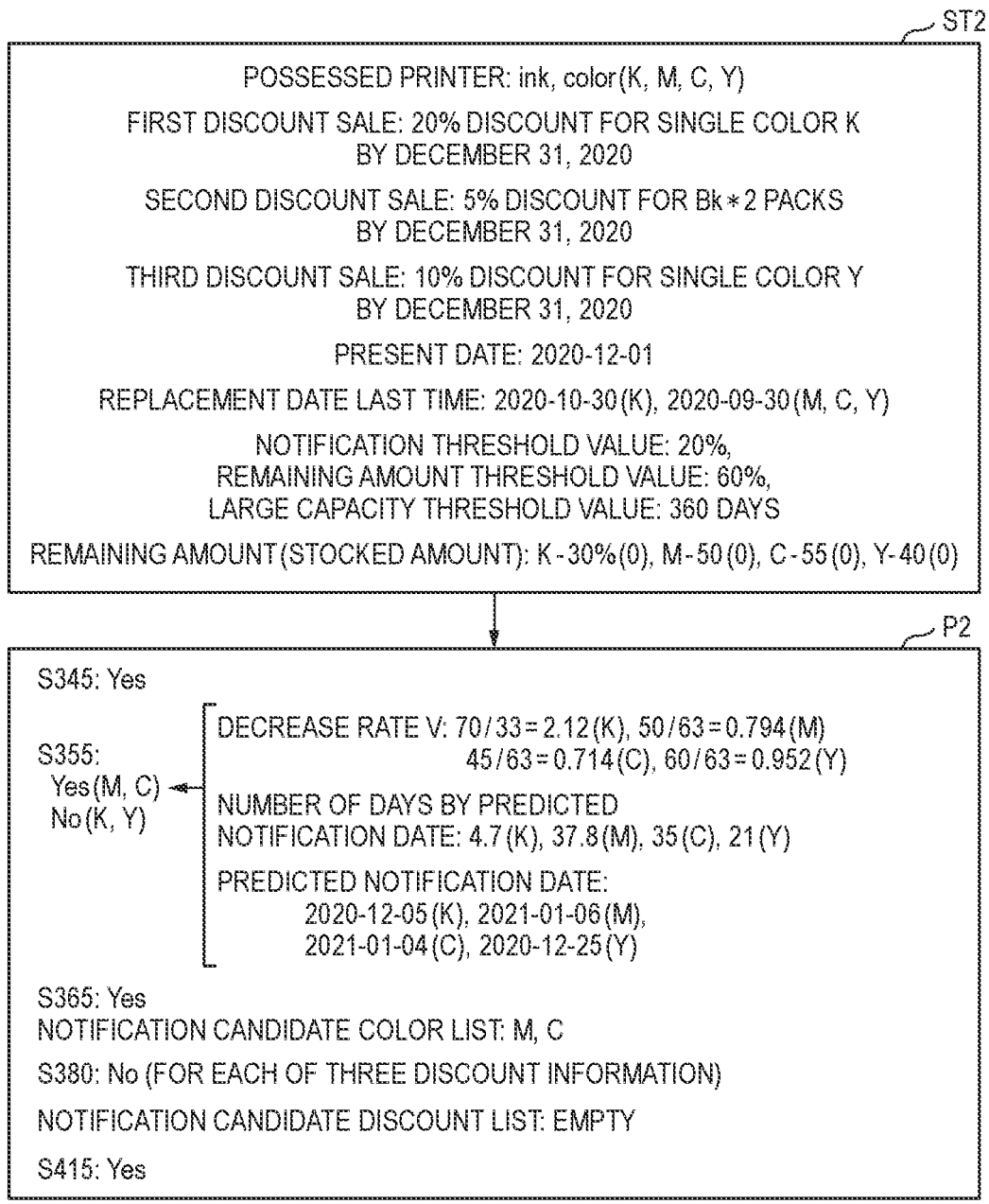
FIG. 15 is a schematic view showing another processing example by the control processing.

FIG. 15 is a schematic view showing another processing example by the control processing. FIG. 15 shows a second situation ST2 and a processing example P2 proceeding under the second situation ST2. In the second situation ST2, the notice user possesses a color inkjet-type printer. Three discount sales are valid. The three discount sales are the same as the three discount sales in FIG. 14A. The current date is Dec. 1, 2020. The replacement date last time for K is Oct. 30, 2020, and the replacement date last time for CMY is Sep. 30, 2020. The notification threshold value, the remaining amount threshold value, and the large capacity threshold value are the same as those in FIG. 14A. In the figure, the remaining amount of each of K, M, C, and Y and the stocked amount (in parenthesis) are shown.

In the processing example P2, contents of various steps of the control processing are shown. Since the stocked amount of each of KMCY is zero, the determination result of S345 (FIG. 8A) for each color is Yes. In S350, the predicted notification date of each of KMCY is calculated. A calculation method is the same as the method described with reference to FIG. 14A. FIG. 15 shows the "decrease rate V", "the number of days by the predicted notification date", and "the predicted notification date" of each of KMCY. The determination results of S355 and S365 for M and C are as follows. For each of the three discount sales, the determination result of S355 is Yes, and the determination result of S365 is Yes. The determination results for K and Y are as follows. The determination result of S355 is No, for each of the three discount sales. From the above, the notification candidate color list (S370 in FIG. 9) shows M and C, for each of the three discount sales. In the meantime, as shown, the three discount sales are discount sales of K or Y. Therefore, for each of the three discount sales, the determination result of S380 is No, the notification candidate discount list is empty, and the determination result of S415 (FIG. 10) is Yes. From the above, the notification of discount information (S430 in FIG. 10) is not executed.

Figure 16A:
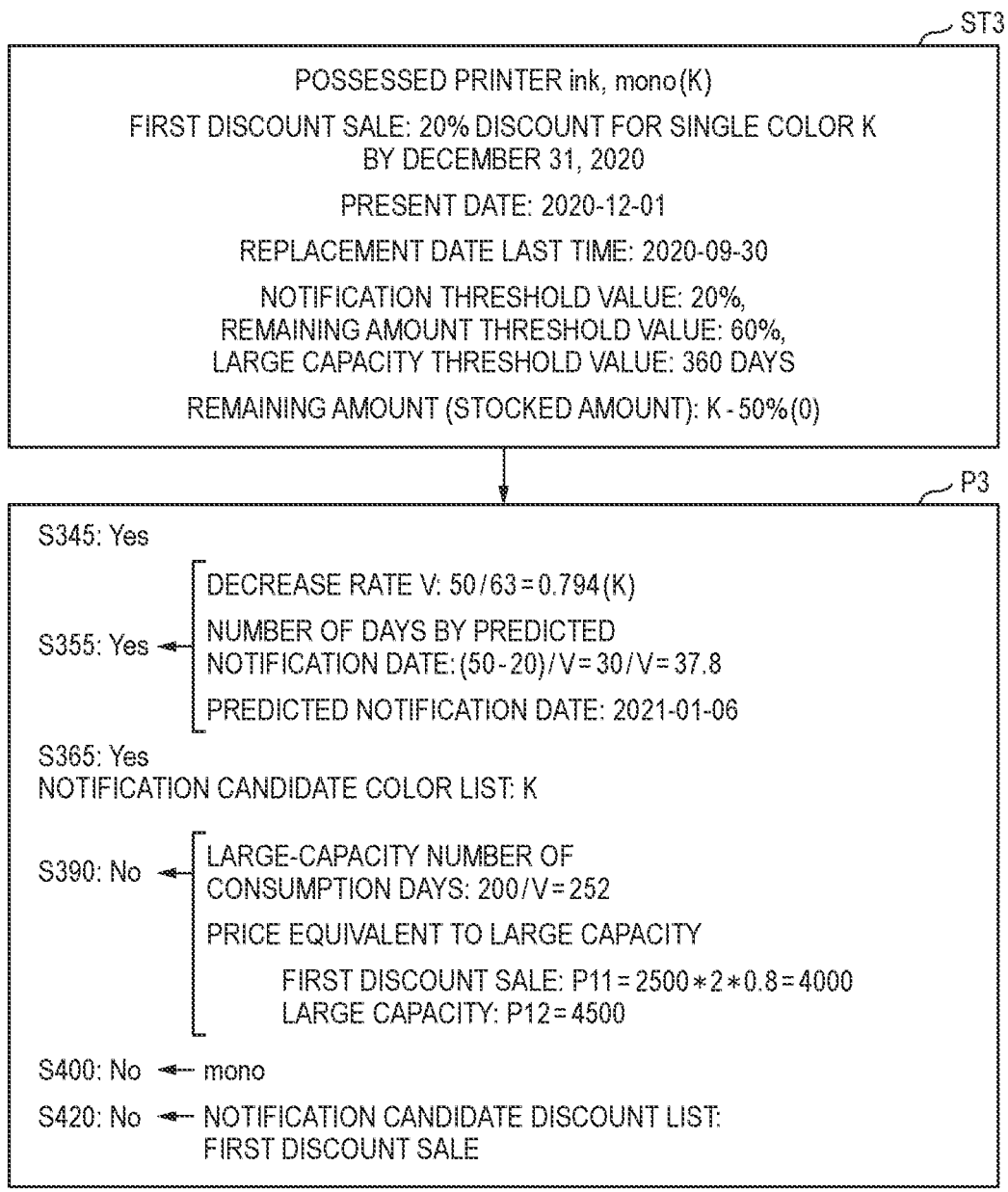
FIGS. 16A to 16C are schematic views showing another processing example by the control processing.
Figure 16B:
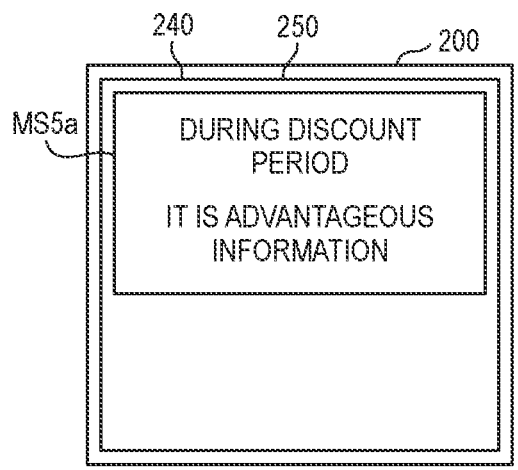
Figure 16C:
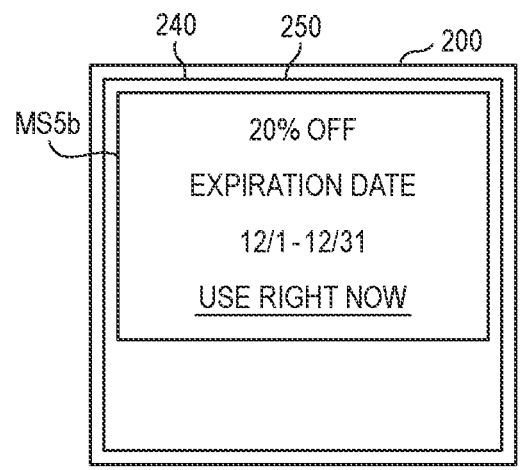

FIGS. 16A to 16C are schematic views showing another processing example by the control processing. FIG. 16A shows a third situation ST3 and a processing example P3 proceeding under the third situation ST3. There are two differences from the first situation ST1 in FIG. 14A. The first difference is that the second discount sale and the third discount sale among the three discount sales are omitted. The second difference is that the replacement date last time is Sep. 30, 2020. The other parts of the third situation ST3 are the same as the corresponding parts of the first situation ST1.

In the processing example P3, contents of various steps of the control processing are shown. Similar to the processing example P1 (FIG. 14A), the determination result of S345 (FIG. 8A) is Yes. In S350, the predicted notification date for K is calculated. In the example of FIG. 16A, the predicted notification date is Jan. 6, 2021. Since the predicted notification date is later than the expiration date, the determination result of S355 (FIG. 8B) is Yes. Further, since the remaining amount (50%) is equal to or less than the remaining amount threshold value (60%), the determination result of S365 (FIG. 8B) is Yes. From the above, the notification candidate color list shows Black K (S370 in FIG. 9).

The number of days Dc calculated in S385 of FIG. 9 (specifically, S620 of FIG. 12) is Am/V=200%/V=252. Since Dc<DcT, the determination result of S630 (FIG. 12) is Yes. In S640, the discount price P11 and the large capacity price P12 are calculated. Here, it is assumed that the price of the usual cartridge of Black K is 2500 Yen and the price of the large-capacity cartridge of Black K is 4500 Yen. The discount price P11 is 2500*2*0.8=4000 Yen. The large capacity price P12 is 4500 Yen. Since P12>P11 (S650: No in FIG. 12), the determination result of S390 (FIG. 9) is No. Further, since the notice printer is a monochrome printer, the notification candidate color list shows only Black K. Therefore, the determination result of S730 of FIG. 13 executed in S395 of FIG. 9 is No, and the determination result of S400 (FIG. 9) is No. From the above, the first discount sale relating to Black K is included in the notification candidate discount list (S405 in FIG. 9), and the determination result of S420 (FIG. 10) is No.

FIGS. 16B and 16C are examples of the discount information notified in S430 (FIG. 10). In each figure, the display unit 240 of the user terminal 200 is shown. A message MS5*a* is displayed on the display unit 240 of FIG. 16B. The message MS5*a* proposes discount information for a limited time. A message MS5*b* in FIG. 16C is an example of information that is displayed in response to tapping on the message MS5*a* (FIG. 16A). The message MS5*b* indicates that a discount sale of 20% OFF will be offered from December 1 to December 31. The user can start the purchase processing by discount sale by tapping the message MS5*b*.

Figure 17:
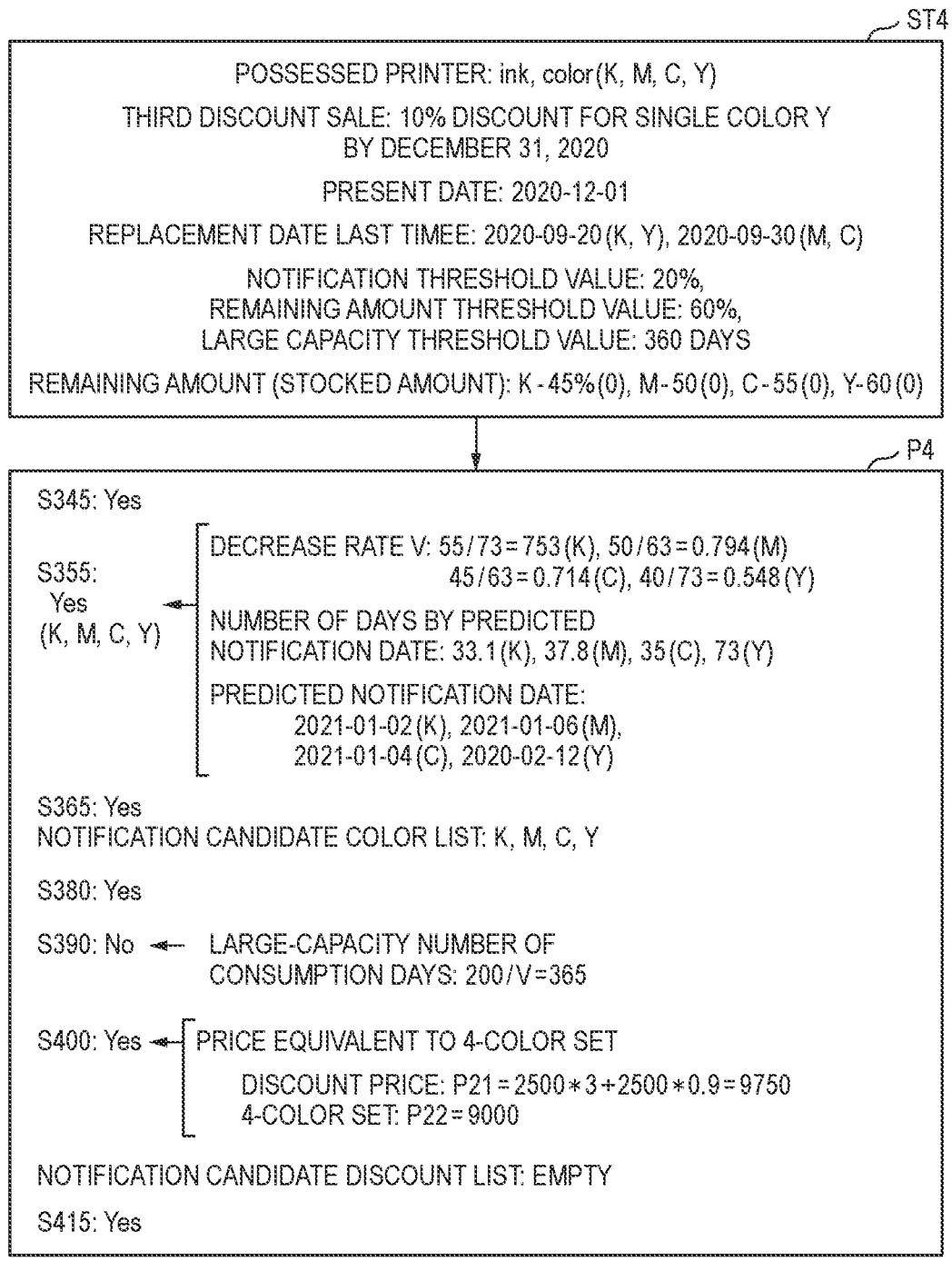
FIG. 17 is a schematic view showing another processing example by the control processing.

FIG. 17 is a schematic view showing another processing example by the control processing. FIG. 17 shows a fourth situation ST4 and a processing example P4 proceeding under the fourth situation ST4. There are three differences from the second situation ST2 in FIG. 15. The first difference is that the first discount sale and the second discount sale among the three discount sales are omitted. The second difference is that the replacement date last time for K and Y is Sep. 20, 2020, and the replacement date last time for M and C is Sep. 30, 2020. The third difference is that the remaining amount of K is 45% and the remaining amount of Y is 60%. The other parts of the fourth situation ST4 are the same as the corresponding parts of the second situation ST2.

In the processing example P4, contents of various steps of the control processing are shown. Since the stocked amount of each of KMCY is zero, the determination result of S345 (FIG. 8A) for each color is Yes. In S350, the predicted notification date of each of KMCY is calculated. A calculation method is the same as the method described with reference to FIG. 14A. FIG. 15 shows the "decrease rate V", "the number of days by the predicted notification date", and "the predicted notification date" of each of KMCY. For each of KMCY, the determination result of S355 (FIG. 8B) is Yes, and the determination result of S365 is Yes. From the above, the notification candidate color list (S370 in FIG. 9) shows KMCY. Since the third discount sale is a discount sale of Y, the determination result of S380 is Yes. In S385 of FIG. 9 (specifically, S620 of FIG. 12), the number of days Dc is calculated for Yellow Y (Dc=200/V=365 days), which is a discount target color of the third discount sale. Since Dc>DcT, the determination result of S630 (FIG. 12) is No, and the determination result of S390 (FIG. 9) is No. As described above, since the notification candidate color list indicates KMCY, the determination result of S730 of FIG. 13 executed in S395 of FIG. 9 is Yes. In S740, the discount price P21 and the set price P22 are acquired. Here, it is assumed that the price of each usual cartridge of KMCY is 2500 Yen and the price of the 4-color pack is 9000 Yen. The third discount sale is a 10% discount for Yellow Y, so that the discount price P21 is 2500*3+2500*0.9=9750 Yen. The set price P22 is 9000 Yen. Since P21>P22, the determination result of S750 (FIG. 13) is No, and the determination result of S400 (FIG. 9) is Yes. From the above, the notification candidate discount list is empty, and the determination result of S415 (FIG. 10) is Yes. The notification of the discount information (S430 in FIG. 10) is not executed.

As described above, in the present embodiment, the CPU 510 of the control server 500 executes the control processing of controlling the notification regarding the consumable (in the present embodiment, the ink that is an example of the printing material) (FIGS. 8A to 10). In S350 of FIG. 8A, specifically, S510 and S515 of FIG. 11, the CPU 510 acquires data indicating the latest cartridge replacement date and the current remaining amount. The data acquired in S510 and S515 is an example of the remaining amount data regarding the remaining amount of the printing material in the printer. In S520, the CPU 510 uses the remaining amount data (here, the replacement date and the remaining amount) to calculate the predicted notification date. The predicted notification date is a predicted execution time (in the present embodiment, a date), at which the processing of notifying the user of the low-remaining amount (S955 in FIG. 5A) is executed. The processing of notifying the user of the low-remaining amount is an example of the predetermined processing relating to the replenishment of the printing material. In S430 of FIG. 10, the CPU 510 transmits the discount information data, which indicates the first information including the discount information, to the user terminal 200. By the processing, the CPU 210 of the user terminal 200 notifies the user of the first information including the information regarding the discount sale of the printing material (specifically, the CPU 210 displays the message on the display unit 240). For example, FIG. 14B, FIG. 14C, FIG. 16B and FIG. 16C). The transmission processing of the discount information data by the CPU 510 is an example of the processing for notifying the user of the information regarding the discount sale. In the processing of FIGS. 8A to 10, the condition to be satisfied for executing the transmission processing of the discount information data (S430) is an example of the first specific condition for notifying the user of the first information including the information regarding the discount sale. As shown in S350 of FIG. 8A and S355 of FIG. 8B, the first specific condition includes that the determination result of S355 is Yes. The determination of S355 is performed using the expiration date D32 and the predicted notification date. In this way, the CPU 510 determines whether the first specific condition is satisfied, with using a plurality of information including a period for the discount sale of the printing material (specifically, a period from the delivery start date D31 to the expiration date D32 in FIG. 3A) and a predicted execution time (specifically, the predicted notification date). Therefore, when appropriate, the CPU 510 can notify the user of the first information including the information regarding the discount sale of the consumable.

In addition, as described in S355 of FIG. 8B, the first specific condition includes the condition that the period for the discount sale of the printing material (the period from the delivery start date D31 to the expiration date D32) expires before the predicted notification date. Therefore, the CPU 510 can notify the user of the first information including the information regarding the discount sale when it is estimated that the discount sale has already expired on the day when the low-remaining amount notification is performed.

Further, the control processing of FIGS. 8A to 10 can be applied to a color printer. The color printer is configured to print an image with using, for example, four varieties of printing materials (for example, KCMY). The CPU 510 executes S350 of FIG. 8A (S510 and S515 in FIG. 11) for each of KCMY. That is, the CPU 510 acquires the remaining amount data regarding the four remaining amounts of the four varieties of printing materials. The first specific condition includes that the determination result of S400 in FIG. 9 is No. The determination of S400 is performed based on the processing of S395, i.e., the processing of FIG. 13. As described in S740 of FIG. 13, the CPU 510 acquires the discount price P21 and the set price P22. The discount price P21 is a price by the discount sale of the four selling products consisting of the four varieties of printing materials. The set price P22 is a price of a set of the four selling products. As described in S750, when the condition (also referred to as the first discount condition) including that the discount price P21 is cheaper than the set price P22 (S750: Yes) is satisfied, the determination result of S400 in FIG. 9 is No. In the embodiment of FIG. 13, the first discount condition includes that the determination result of S730 is Yes. The first discount condition also includes other conditions of FIGS. 8A to 10 for executing S430 of FIG. 10 (for example, the determination result of S355 in FIG. 8B is Yes). In this way, when the first discount condition is satisfied, the first specific condition is satisfied. When the first discount condition is satisfied, in S430 of FIG. 10, the CPU 510 transmits discount information data, which indicates the information regarding the discount sale of the four selling products of KCMY (not shown). In this way, the CPU 510 can notify the user of the advantageous information. Note that, when the determination result of S730 in FIG. 13 is No, the determination result of S400 in FIG. 9 is No, regardless of a magnitude relationship between the discount price P21 and the set price P22. In this way, the first specific condition can be satisfied even when the first discount condition is not satisfied.

Further, as shown in S345 of FIG. 8A, the first specific condition includes a condition that the user does not have a stock of the printing material to be notified. Therefore, the user can receive a notification when the user does not have a stock of the printing material.

Further, as shown in S365 of FIG. 8B, the first specific condition includes that the remaining amount of the printing material is equal to or less than the remaining amount threshold value. Therefore, the user can receive a notification when the remaining amount is equal to or less than the remaining amount threshold value.

Further, as described above, the CPU 510 of the control server 500 acquires the remaining amount data regarding the remaining amount of the printing material in the printer, in S350 of FIG. 8A, specifically, S510 and S515 of FIG. 11. In S385 of FIG. 9, the CPU 510 executes the processing of FIG. 12. In S610 of FIG. 12, the CPU 510 acquires the decrease rate V of the remaining amount indicated by the remaining amount data. The determination result of S630 is Yes when the decrease rate V is equal to or larger than the threshold value (Am/DcT). In this case, the CPU 510 can execute S680. In S680, the CPU 510 sets the recommendation information indicating that the purchase of a large-capacity cartridge is recommended. In S945 and S955 of FIG. 5A, the CPU 510 executes the processing for notifying the user of the information regarding the purchase of a large-capacity cartridge indicated by the recommendation information (FIGS. 6D and 6E). Further, when the determination result of S630 in FIG. 12 is No (i.e., the decrease rate V is below Am/DcT), S680 is not executed. In this case, in S950 and S955 of FIG. 5A, the CPU 510 executes the processing for notifying the user of the information regarding the purchase of a usual cartridge (FIG. 6A). In this way, the CPU 510 executes the processing (S945, S950 and S955) for notifying the user of the information regarding the purchase of a selling product associated with the decrease rate V of the remaining amount. Therefore, the CPU 510 can notify the user of the information regarding the purchase of a selling product of the printing material suitable for the decrease rate V of the remaining amount. Note that, the condition that should be satisfied for executing the notification (S945, S950, S955) of the information associated with the decrease rate V is an example of the second specific condition for notifying the user of the second information including the information regarding the purchase of a selling product associated with a change in remaining amount over time. In the present embodiment, the second specific condition includes that the determination result of S920 is Yes (i.e., the remaining amount is equal to or less than the notification threshold value).

Further, as described with reference to FIG. 12, the usual cartridge is associated with the first range, which is a range of the decrease rate V below the threshold value (Am/DcT). The large-capacity cartridge is associated with the second range, which is a range of the decrease rate V equal to or larger than the threshold value (Am/DcT). Therefore, the CPU 510 can notify the user of the information regarding the purchase of a large-scaled printing material (i.e., a large-capacity cartridge) when the decrease rate V is large.

Further, in the present embodiment, as shown in S640 and S650 of FIG. 12, S680 is executed when the determination result of S630 is Yes and the determination result of S650 is No. When the determination result of S650 is Yes, S680 is not executed even if the determination result of S630 is Yes. In this way, the second specific condition for notifying the user of the information regarding the purchase of a selling product associated with the decrease rate V of the remaining amount includes that the determination result of S650 in FIG. 12 is No. As described above, when the large capacity price P12 is equal to or less than the discount price P11, the determination result of S650 is No. The discount price P11 is a price corresponding to the large capacity Am based on a price by discount sale of a printing material of a usual capacity. The second specific condition includes that the large capacity price P12 is equal to or less than the discount price P11. Therefore, the CPU 510 can notify the user of the advantageous information.

B. Modified Embodiment (1) In the embodiment of FIG. 9, the CPU 510 determines whether a large-capacity cartridge is recommended in S385 and S390, and determines whether the multi-color set is recommended in S395 and S400. The CPU 510 may further determine whether 2 packs are recommended. The processing of determining whether 2 packs are recommended may be, for example, processing that is obtained by replacing the "multi-color set" with "2 packs" in the determination processing of FIG. 13. Such determination processing can notify purchase of a cartridge, as follows. It is assumed that the notice printer is a monochrome printer. It is assumed that the price of the usual cartridge of Black K is 1000 Yen and the price of 2 packs of Black K is 1600 Yen. In addition, it is assumed that the discount sale is a 10% discount of the usual cartridge of Black K. In this case, the price of purchasing two cartridges by discount sale is 1000*0.9*2=1800 Yen. The price of 2 packs (1600 Yen) is cheaper than the price by discount sale (1800 Yen). In this case, the CPU 510 sets recommendation information, which indicates that the purchase of two packs is recommended, as in S780 in FIG. 13. Then, in the processing of FIGS. 5A and 5B, the CPU 510 executes S945 and S955 to notify the user of the information regarding the purchase of 2 packs indicated by the recommendation information.

In general, a printer may be configured to print an image with using L varieties of consumables (L is an integer equal to or larger than 1). The L varieties of consumables are not limited to one type of a printing material of Black K and four varieties of printing materials of CMYK, and may consist of any number of any kind of printing material, such as three varieties of printing materials of CMY and two varieties of printing materials of K and Y. In S510 and S515 of FIG. 11, the CPU 510 acquires remaining amount data indicating information regarding the L remaining amounts of the L varieties of printing materials. Then, the CPU 510 may determine whether a set of N selling products (N is an integer equal to or larger than 2) is recommended, according to a modified first discount condition described below. The set of N selling products may be a set of N cartridges of N varieties of printing materials such as a 4-color pack, and may be a set of N cartridges of one variety of printing material such as 2 packs of Black K. The modified first discount condition includes a condition that a price by discount sale of N selling products (N is an integer equal to or larger than 2) consisting of one or more varieties of printing materials among the L varieties of printing materials is cheaper than a price of a set of N selling products. When the first discount condition is satisfied, the first specific condition is satisfied. Then, in S430 of FIG. 10, the CPU 510 transmits discount information data indicating information regarding the discount sale of N selling products. When the price of the set of N selling products is cheaper than the price by the discount sale of N selling products, the CPU 510 sets recommendation information indicating that purchase of the set of N selling products is recommended, as in S780 in FIG. 13. Then, in S945 and S955 of FIG. 5A, the CPU 510 executes processing for notifying the user of the information regarding the purchase of a set of N selling products indicated by the recommendation information.

(2) The first specific condition for notifying the discount information is not limited to the conditions described in the above-described embodiment and the modified embodiment, and may also be various conditions. For example, S650 in FIG. 12 may be omitted. Here, the CPU 510 may execute S670 and S680 when the determination result of S630 is Yes. The condition of S355 in FIG. 8B may be that the notice discount sale expires before the predicted notification date+U day (U is a predetermined integer equal to or larger than 1). Further, S350 in FIG. 8A and S355 in FIG. 8B may be omitted. S340 and S345 in FIG. 8A may be omitted. S385 and S390 in FIG. 9 may be omitted. S395 and S400 in FIG. 9 may be omitted. In general, the first specific condition may be various conditions that are determined using a plurality of information including a period for discount sale of a consumable and a predicted execution time, at which a predetermined processing (for example, notification of low-remaining amount) relating to replenishment of a printing material is executed. For example, the first specific condition may include a condition that a period for discount sale of a consumable expires before a reference date (for example, the predicted notification date, the predicted notification date+U day, and the like) determined based on the predicted execution time.

(3) In the embodiment of FIG. 12, the range of the decrease rate V is divided into two ranges, according to the threshold value (Am/DcT). The number of divisions of the range of the decrease rate V may also be 3 or more. For example, the CPU 510 may divide the range of the decrease rate V into a low rate range, a medium rate range, and a high rate range. A usual cartridge may be associated with the low rate range, a large-capacity cartridge may be associated with the medium rate range, and 2 packs may be associated with the high rate range. When the decrease rate V is within the low rate range, the CPU 510 may determine that a large capacity or 2 packs are not recommended, as in the case where the determination result of S630 is No. When the decrease rate V is within the medium rate range or the high rate range, the CPU 510 may determine whether or not to recommend a selling product associated with the decrease rate V with using a price of a selling product associated with the decrease rate V and a price by discount sale of a selling product equivalent to the selling product associated with the decrease rate V, as in the case where the determination result of S630 is Yes.

Further, the second specific condition for notifying the second information including the information regarding the purchase of a selling product associated with a change in remaining amount over time (for example, the decrease rate V) is not limited to the conditions described in the above-described embodiment and the modified embodiment, and may be various conditions. For example, the condition regarding the price of a selling product may be omitted. In general, the second specific condition may be any condition determined in advance. For example, the second specific condition may include that the current date is within a period for discount sale of a selling product (referred to as a corresponding selling product) associated with the change in remaining amount over time indicated by the remaining amount data. The second specific condition may include that a price of the corresponding selling product is equal to or less than a price, which is calculated based on a price of a different type of selling product (referred to as other type of selling product) from the corresponding selling product and is a price corresponding to an amount of a consumable of the corresponding selling product. For example, the corresponding selling product may be a large-capacity cartridge or a "2 packs" of a usual cartridge, and the other type of selling product may be one usual cartridge. Here, the other type of selling product is a selling product of a consumable that is the same as the corresponding selling product. Further, as the price of the other type of selling product, a price by discount sale of the other type of selling product may be used.

(4) The control processing of notification is not limited to the processing described in the above-described embodiment and the modified embodiment, and may be various processing. For example, the processing of FIG. 10 may be omitted, and when the determination result of S410 of FIG. 9 is Yes, the CPU 510 may end the control processing. That is, the notification of discount information may be omitted. In this case, the control processing may set recommendation information for recommending the purchase of a specific selling product, such as purchase of a large-capacity cartridge or purchase of a multi-color set (for example, S385 and S395 in FIG. 9).

(5) The remaining amount data regarding the remaining amount is not limited to the data indicating the latest cartridge replacement date and the current remaining amount, and may also be data indicating various information regarding the remaining amount. For example, the remaining amount data may be data indicating the number of printed pages per unit time (for example, one month). The more the printed pages per unit time are, the faster the decrease rate V of the printing material is. The printed page per unit time is an example of the information regarding the remaining amount.

(6) The processing of calculating the predicted notification date is not limited to the processing of using the decrease rate V of the remaining amount, as in the processing of FIG. 11, and may be various other processing. For example, a remaining amount-days relationship, which is a correspondence relationship between the remaining amount and the number of days necessary for the remaining amount to decrease to the notification threshold value, may be determined in advance. The CPU 510 may calculate the predicted notification date with reference to the remaining amount-days relationship. Here, the remaining amount-days relationship may be commonly used for a plurality of users.

(7) The predetermined processing relating to replenishment of the printing material may be various processing relating to replenishment of the printing material, instead of the processing of notifying the user of the low-remaining amount (S955 in FIG. 5A). For example, cartridge replacement processing by the user, processing by the control server 500 for shipping a new cartridge, ordering processing of a new cartridge by the user terminal 200, and the like may be adopted. In any case, in S350 of FIG. 8A, the CPU 510 calculates the predicted execution time, at which such processing is executed, with using the remaining amount data. It is preferable that the CPU 510 calculates the predicted execution time so that the faster the decrease rate V of the remaining amount indicated by the remaining amount data is, the closer the predicted execution time is. The predicted execution time may be a period having a range of 2 days or more, instead of the date. The determination condition of S355 may be that the notice discount sale expires before the predicted execution time begins.

(8) The notification of the information to the user may be any notification, instead of displaying the message. For example, notification such as display of an image such as a pictogram by a user's terminal, transmission of an e-mail to a user's e-mail address, transmission of an SMS (Short Message Service) message to a user's phone number, transmission of an MMS (Multimedia Messaging Service) message to a user's terminal, output of a sound by a user's terminal, and the like may be adopted. In any case, the CPU 510 of the control server 500 may execute processing for such notification (for example, transmission of message data) in S955 (FIG. 5A) and S430 (FIG. 10).

(9) The configuration of the printer may be various configurations capable of printing an image, instead of the configuration of the printer 100 of FIG. 1. The printer may be various apparatuses having a printing execution unit configured to perform printing. For example, the printer may be an apparatus including a printing execution unit and a reading execution unit, such as a complex machine, a copier, and a facsimile apparatus. The reading execution unit is a device configured to generate image data of a read document by optically reading a document. Further, the printing execution unit may be a thermal transfer type or LED type device, instead of the inkjet type or laser type device. The LED method is a method of exposing a photosensitive body with using an LED head. In the LED method, an image is printed using toner, similar to the laser method. In the thermal transfer method, an image is printed using an ink ribbon. The consumable relating to the notification is not limited to ink and toner, and may be any consumable that is used for printing an image (for example, an ink ribbon). In a case where the consumable is an ink ribbon, a selling product of the consumable may be a roll of the ink ribbon or a cassette containing the ink ribbon. Further, the consumable may be another kind of consumable different from the printing material such as ink, toner, and ink ribbon.

(10) Instead of the control server 500, various other apparatuses may control the notification. For example, the printer 100 may execute the processing of the control server 500, instead of the control server 500. Further, a plurality of apparatuses (for example, a computer) capable of communicating with each other via a network may partially share a function of processing for controlling notification and provide the function of processing as a whole (a system including the apparatuses corresponds to the control device).

In each of the above-described embodiments, some of the configurations implemented by hardware may be replaced with software, and to the contrary, some or all of the configurations implemented by software may be replaced with hardware. For example, the function of the calculation processing (S350) of FIG. 8A may be implemented by a dedicated hardware circuit.

In addition, in a case where some or all of the functions of the present invention are implemented by a computer program, the program may be provided in a form of being stored in a computer-readable recording medium (for example, a non-transient recording medium). The program may be used in a state of being stored in a recording medium (computer-readable recording medium) that is the same as or different from the recording medium at the time of provision. The 'computer-readable recording medium' is not limited to a portable recording medium such as a memory card and a CD-ROM, and may include an internal storage device in a computer, such as various ROMs, and an external storage device connected to the computer, such as a hard disk drive.

Although the present invention has been described based on the embodiments and the modified embodiments, the embodiments of the present invention are to easily understand the present invention, not to limit the present invention. The present invention can be changed and improved without departing from the gist thereof, and equivalents thereof are included in the present invention.

What is claimed is:

1. A non-transitory computer-readable storage medium storing a computer program for a computer configured to control a notification regarding a consumable, the computer program comprising instructions that, when executed, cause the computer to perform:
    acquiring remaining amount data regarding a remaining amount of a consumable in a printer; and
    processing for notifying a user of information including information regarding purchase of a selling product associated with a change in remaining amount over time indicated by the remaining amount data among a plurality of selling products of the consumable, in a case where a specific condition is satisfied, the specific condition including a condition that a price of the selling product of a second scale is equal to or less than a price equivalent to the second scale based on a price by discount sale of the selling product of a first scale,
    wherein a selling product of the first scale is associated with the change in remaining amount over time within a first range, and
    wherein a selling product of the second scale larger than the first scale is associated with the change in remaining amount over time within a second range in which the remaining amount shows a faster decrease rate than the first range.

2. A control device configured to control a notification regarding a consumable, the control device comprising:
    an acquisition unit configured to acquire remaining amount data regarding a remaining amount of a consumable in a printer; and
    a notification unit configured to perform processing for notifying a user of information including information regarding purchase of a selling product associated with a change in remaining amount over time indicated by the remaining amount data among a plurality of selling products of the consumable, in a case where a specific condition is satisfied, the specific condition including a condition that a price of the selling product of a second scale is equal to or less than a price equivalent to the second scale based on a price by discount sale of the selling product of a first scale,
    wherein a selling product of the first scale is associated with the change in remaining amount over time within a first range, and
    wherein a selling product of the second scale larger than the first scale is associated with the change in remaining amount over time within a second range in which the remaining amount shows a faster decrease rate than the first range.

3. The control device according to claim 2, wherein a scale is a size of the selling product and wherein the selling product of the second scale is a larger size than the selling product of the first scale.

4. The control device according to claim 2, wherein a scale is a number of selling products within a single package for the selling product and wherein the selling product of the second scale has more selling products within a single package than the selling product of the first scale.

5. The control device according to claim 2, further comprising:
    determining whether the change in remaining amount over time is the first range or the second range and in response to determining that the change in remaining amount over time is the second range, the notifying include a recommendation to purchase the selling product of the second scale when an additional condition is satisfied.

6. The control device according to claim 2, wherein the notifying includes information related to the first scale and the second scale.

* * * * *